United States Patent
Yamasaki et al.

(10) Patent No.: US 6,630,070 B2
(45) Date of Patent: Oct. 7, 2003

(54) WASTEWATER TREATMENT METHOD AND WASTEWATER TREATMENT EQUIPMENT FOR RECYCLING REACTANTS AND UNREACTED CHEMICALS

(75) Inventors: Kazuyuki Yamasaki, Hiroshima (JP); Norio Sawai, Kitakatsuragi-gun (JP); Kazumi Chujou, Ayauta-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 82 days.

(21) Appl. No.: 09/825,862

(22) Filed: Apr. 5, 2001

(65) Prior Publication Data

US 2001/0037981 A1 Nov. 8, 2001

(30) Foreign Application Priority Data

Apr. 7, 2000 (JP) .......................... 2000-106434

(51) Int. Cl.[7] .......................... C02F 3/00; B01D 35/00; B01D 24/00
(52) U.S. Cl. .................. 210/607; 210/624; 210/631; 210/205; 210/207; 210/208
(58) Field of Search ................ 210/623–628, 210/607, 631, 205, 207, 208

(56) References Cited

U.S. PATENT DOCUMENTS

| | | | | |
|---|---|---|---|---|
| 5,264,130 A | * | 11/1993 | Etlin | 210/626 |
| 6,368,511 B1 | * | 4/2002 | Weissenberg et al. | |
| 6,423,214 B1 | * | 7/2002 | Lindbo | 210/122 |

FOREIGN PATENT DOCUMENTS

| | | | | |
|---|---|---|---|---|
| JP | 58128199 A | * | 7/1983 | ........... C02F/11/12 |
| JP | 61107996 A | * | 5/1986 | ............. C02F/3/34 |
| JP | 6-262170 | | 9/1994 | |
| JP | 9-019681 | | 1/1997 | |
| JP | 9-276875 | | 10/1997 | |

* cited by examiner

Primary Examiner—Chester T. Barry
(74) Attorney, Agent, or Firm—Nixon & Vanderhye P.C.

(57) ABSTRACT

A wastewater treatment equipment is provided with a reaction tank and a separate reaction unit installed in the reaction tank. In the separate reaction unit, a reaction different from a reaction in the reaction tank is carried out with returned sludge and a acid or alkali. Reactants are generated from the returned sludge in the separate reaction unit and then introduced from a bottom portion of the separate reaction unit into the reaction tank so as to be used for wastewater treatment.

17 Claims, 17 Drawing Sheets

Fig. 10A

WHEN FLUORINE CONCENTRATION IN WASTEWATER IS NORMAL

| TANK | RETENTION TIME | TIMING (ELAPSED TIME) | | | | | | | | | | | | | | |
|---|---|---|---|---|---|---|---|---|---|---|---|---|---|---|---|
| | | 1H | 2H | 3H | 4H | 5H | 6H | 7H | 8H | 9H | 10H | 11H | 12H | 13H | 14H | 15H |
| FIRST TANK | 2H | | | | | | | | | | | | | | | |
| SECOND TANK | 1H | | | | | | | | | | | | | | | |
| THIRD TANK | 0.5H | | | | | | | | | | | | | | | |
| FOURTH TANK | 0.5H | | | | | | | | | | | | | | | |
| FIFTH TANK | 3H | | | | | | | | | | | | | | | |
| SIXTH TANK | 5H | | | | | | | | | | | | | | | |

Fig. 10B

WHEN FLUORINE CONCENTRATION IN WASTEWATER IS LOW

| TANK | RETENTION TIME | TIMING (ELAPSED TIME) | | | | | | | | | | | | | | |
|---|---|---|---|---|---|---|---|---|---|---|---|---|---|---|---|
| | | 1H | 2H | 3H | 4H | 5H | 6H | 7H | 8H | 9H | 10H | 11H | 12H | 13H | 14H | 15H |
| FIRST TANK | 2H | | | | | | | | | | | | | | | |
| SECOND TANK | 1H | | | | | | | | | | | | | | | |
| THIRD TANK | 0.5H | | | | | | | | | | | | | | | |
| FOURTH TANK | 0.5H | | | | | | | | | | | | | | | |
| FIFTH TANK | 3H | | | | | | | | | | | | | | | |
| SIXTH TANK | 5H | | | | | | | | | | | | | | | |

WASTEWATER TREATMENT METHOD AND WASTEWATER TREATMENT EQUIPMENT FOR RECYCLING REACTANTS AND UNREACTED CHEMICALS

BACKGROUND OF THE INVENTION

The present invention relates to a method of treating wastewater and a wastewater treatment equipment, in particular, for recycling reactants and unreacted chemicals to reduce genesis sludge capacity and consumption of chemicals.

In an era of reducing waste, various methods of reducing sludge generated in a wastewater treatment equipment are being studied.

Also, a method of treating wastewater of regenerating and recycling sludge generated from chemicals in use such as a coagulant and the like is being examined with the objective of reducing treatment costs.

For example, with regard to sludge containing unreacted chemicals, a method of reusing the unreacted chemicals is employed. The unreacted chemicals include unreacted calcium hydroxide, unreacted aluminium hydroxide and so on. When aluminium hydroxide sludge is generated, aluminium is eluted from the sludge to reuse the aluminium. These unreacted chemicals are reused for the purpose of reducing a genesis sludge capacity and consumption of chemicals.

FIG. 17 shows an example of these conventional wastewater treatment equipment. In this conventional equipment, wastewater flows into a first water tank 101 used as a raw water tank. After the wastewater stored in the first water tank 101 for a certain period of time, the wastewater is introduced into a conventional reaction tank 134 by a raw water pump 102.

This reaction tank 134 is provided with a rapid reaction tank agitator 105 and a pH meter 106. Returned sludge containing reactants and unreacted chemicals is introduced into the reaction tank 134 and an acid or alkali is added to the returned sludge. As a more specific example, returned sludge in a wastewater treatment equipment for treating fluorine contains aluminium fluoride as a reactant and aluminium hydroxide as an unreacted chemical. The pH in the reaction tank 134 needs to be eleven or higher to reliably elute aluminium from aluminium fluoride and aluminium hydroxide in the returned sludge.

However, a large amount of alkali such as calcium hydroxide or the like is required to adjust to pH 11 or higher in the reaction tank 134. Therefore, particularly when calcium hydroxide is added, not only running costs are increased since the consumption of chemicals added into the reaction tank is increased, but also sludge is generated by calcium hydroxide.

In general, poly aluminium chloride, aluminium sulfate or the like is excessively added as a coagulant in wastewater treatment. Therefore, various methods of regenerating and recycling the above aluminum compounds are being studied.

Such prior art includes the one disclosed in Japanese Patent Laid-Open Publication HEI 9-276875. This prior art is a method of treating wastewater for reducing the quantity of generated sludge and chemicals used for fluorine wastewater treatment. Specifically, aluminium sulfate is added to fluorine-containing wastewater as a coagulant to generate precipitates in a first reaction tank with pH 6.5. Subsequently, after the precipitates are separated by a precipitating tank, water and sulfuric acid are added to the precipitates in a separate second reaction tank and adjust to pH 4.0 so that coprecipitated fluorine is eluted. Then, after a solution containing fluorine is separated in a precipitating tank, the remaining precipitates are returned to the first reaction tank and recycled as a coagulant.

In these reactions, aluminium sulfate sludge is precipitated in a neutral region while containing fluorine and the fluorine is introduced from the precipitate (elution of fluorine) into an acidic or alkaline region. Aluminium sulfate is recycled as a coagulant containing no fluorine in the precipitate in the acidic or alkaline region. Consequently, the quantity of generated sludge and aluminium sulfate as a coagulant chemical are reduced by recycling aluminium sulfate.

Another prior art is disclosed in Japanese Patent Laid-Open Publication HEI 6-262170. In this prior art, after aluminium hydroxide is used to adsorb fluorine contained in wastewater in a first reaction tank, calcium chloride is allowed to act on fluorine-adsorbed aluminium hydroxide in a second reaction tank with pH 8. Subsequently, wastewater is introduced into a precipitating tank so as to allow calcium chloride to act on the fluorine-adsorbed aluminium hydroxide. Calcium fluoride formed thereby is precipitated and separated.

In a supernatant separated by this precipitation, aluminium hydroxide is regenerated to produce an aluminate solution. Furthermore, the aluminate becomes aluminium hydroxide by adjusting to pH 7 in a third separate reaction tank. Thus, aluminium hydroxide is regenerated as a coagulant. This aluminium hydroxide is returned to the first reaction tank and thus a recycling is completed. As a result of this prior art, the consumption of aluminum as a coagulant and the quantity of aluminium hydroxide sludge can be reduced.

Furthermore, another prior art is disclosed in Japanese Patent Laid-Open Publication HEI 9-19681. In this prior art, after fluorine contained in wastewater is adsorbed to aluminium hydroxide in the first reaction tank, wastewater is introduced into the precipitating tank to be separated into supernatant and aluminium hydroxide as precipitate. Subsequently, excessive calcium sulfate is added into a second separate reaction tank to generate calcium fluoride. Consequently, fluorine adsorbed to aluminium hydroxide is desorbed.

By fixing a surplus calcium ingredient as hardly soluble calcium sulfate, aluminium hydroxide is generated with a strong alkali in a third separate reaction tank (dissolving tank). This generated aluminium hydroxide is returned to the first reaction tank and thus a recycling is completed. As a result of this prior art, the consumption of aluminum as a coagulant and the quantity of aluminium hydroxide sludge can be reduced.

As shown in FIG. 17, a common reaction tank used in the above-described prior art is a usual water tank in which a rapid reaction tank agitator 105 and a pH meter 106 are installed in a conventional reaction tank 134.

First of all, it is required to solve problems related to a recycling in a conventional reaction tank 134 by constructing a reaction tank in which, for example, aluminium contained in returned sludge as an active ingredient is easily eluted and recycled.

In the above-described prior art disclosed in Japanese Patent Laid-Open Publication HEI 9-276875, 6-262170 and 9-19681, a reaction tank and a precipitating tank are required in any case when aluminium hydroxide is regenerated. Consequently, a problem arises that costs for constructing a system including equipment related to a reaction tank and a precipitating tank are high.

Specifically, for example, it is required to clarify conditions of regenerating aluminium hydroxide, aluminium fluoride or the like and examining the conditions in detail so that a wastewater treatment system achieving an object of regeneration can be constructed with little equipment investment.

SUMMARY OF THE INVENTION

Accordingly, an object of the present invention is to provide a method of treating wastewater and a wastewater treatment equipment with reduced waste at low cost and, furthermore, to provide a method of treating wastewater and a wastewater treatment equipment which can regenerate objective substances for use in wastewater treatment with little equipment investment.

In order to achieve the above object, the present invention provides a method of treating wastewater comprising the steps of: introducing wastewater into a reaction tank; introducing returned sludge into a separate reaction unit installed in the reaction tank to obtain a separate reactant by carrying out a separate reaction from a reaction in the reaction tank; and introducing the separate reactant from the separate reaction unit into the reaction tank.

According to this invention, a predetermined reaction is carried out in a reaction tank while a separate reaction is carried out in a separate reaction tank. Separate reactants generated from returned sludge by the separate reaction are introduced into the reaction tank and can be used for wastewater treatment in the reaction tank. Since the separate reaction tank is provided in the reaction tank, equipment investment costs can be minimized. Therefore, a method of treating wastewater with reduced waste can be achieved at low cost.

The present invention also provides a wastewater treatment equipment comprising: a reaction tank into which wastewater is introduced for reaction of the wastewater; and a separate reaction unit installed in the reaction tank, into which returned sludge is introduced, in which a separate reaction from a reaction in the reaction tank is carried out to obtain a separate reactant, and from which the separate reactant is introduced into the reaction tank.

According to this invention, the separate reaction unit is constituted in the reaction tank so as to carry out two separate reactions as a two-stage reaction. The reaction in the separate reaction unit generates a separate reactant from the returned sludge tank, and the separate reactant is directly introduced from the separate reaction unit into the reaction tank to be used for wastewater treatment in the reaction tank. Therefore, a wastewater treatment equipment with reduced waste can be produced at low cost.

In one embodiment of the invention, the separate reaction unit is an elution unit for eluting a chemical from reactants and unreacted chemicals contained in the returned sludge.

According to this embodiment, chemicals are eluted from the reactants and unreacted chemicals in the separate reaction unit, so that the eluted chemicals can be usefully recycled for wastewater treatment in the reaction tank. Aluminium fluoride and aluminium hydroxide can be mentioned as a specific example of reactants and unreacted chemicals, respectively.

In one embodiment of the invention, the reactants and the unreacted chemicals are substances derived from coagulants.

According to this embodiment, the unreacted chemicals derived from coagulants can be recycled to reduce the consumption of the coagulants. In general, a large amount of coagulant such as poly aluminium chloride is used for fluorine treatment in a fluorine wastewater treatment equipment.

In one embodiment of the invention, an acid or a alkali is added into the elution unit.

According to this embodiment, since an acid or alkali is added into the elution unit, chemicals are easily eluted from the reactants and unreacted chemicals by the acid or alkali. As a specific example, aluminum as an active ingredient is eluted by changing pH of aluminium fluoride as a reactant and aluminium hydroxide as an unreacted chemical.

In one embodiment of the invention, the returned sludge contains aluminium or iron.

According to this embodiment, aluminium or iron is eluted from the returned sludge so as to be recycled.

In one embodiment of the invention, the acid is a mineral acid and the alkali is calcium hydroxide or sodium hydroxide or both of them.

According to this embodiment, since the acid is a mineral acid such as sulfuric acid, hydrochloric acid or nitric acid, a wastewater treatment equipment can be easily constructed. Since the alkali is calcium hydroxide or sodium hydroxide or both of them, which are representative chemicals widely used, a wastewater treatment equipment can be easily constructed. It is generally known that when an acid is added to sludge, sludge is dissolved. That is, ingredients can be eluted by adding sulfuric acid, hydrochloric acid or nitric acid to sludge. Sludge ingredients can also be eluted by adding a alkali such as calcium hydroxide or sodium hydroxide to sludge. For example, it is typical that aluminium is eluted by adding calcium hydroxide to aluminium hydroxide sludge to raise the pH.

In one embodiment of the invention, the separate reaction unit is provided with an agitating means.

According to this embodiment, reaction efficiency in the reaction unit is improved by agitation with the agitating means.

In one embodiment of the invention, the agitating means of the separate reaction unit is a non-submersible agitator.

Since a non-submersible agitator is the most common type, a wastewater treatment equipment can be easily constructed.

In one embodiment of the invention, the agitating means of the separate reaction unit is a submersible agitator.

According to this embodiment, since a submersible agitator is installed in a water tank of the separate reaction unit, a wastewater treatment equipment can be constructed without making noise in a place with a strict noise regulation.

In one embodiment of the invention, the agitating means of the separate reaction unit is an agitating means by aeration.

According to this embodiment, since agitation in the separate reaction unit is performed by aeration, no noise is made and sludge can be loosened additionally.

In one embodiment of the invention, a pH meter is installed in the separate reaction unit.

According to this embodiment, since pH of the separate reaction unit can be sensed and recognized by the pH meter, optimal pH conditions for regeneration in the separate reaction unit can be recognized and set.

In one embodiment of the invention, the separate reaction unit is a line mixer.

According to this embodiment, the line mixer enables the inflow returned sludge and an acid or alkali to be physically agitated. That is, the returned sludge can be agitated without installing an agitating means such as an agitator or the like.

In one embodiment of the invention, the separate reaction unit is a cyclone.

According to this embodiment, the cyclone enables the inflow returned sludge and an acid or alkali to be physically agitated. That is, the returned sludge can be agitated without installing an agitating means such as an agitator or the like.

The present invention also provides a wastewater treatment equipment for treatment of fluorine wastewater, comprising: an acid raw water tank; a reaction tank; a poly aluminium chloride coagulating tank; a polymer coagulant coagulating tank; a precipitating tank; and an elution unit installed in the reaction tank, into which returned sludge from the precipitating tank is introduced, in which a separate reaction from a reaction in the reaction tank is carried out to elute a chemical from reactants and unreacted chemicals contained in the returned sludge, and from which the eluted chemical is introduced into the reaction tank.

According to this invention, an active ingredient in unreacted chemicals is eluted in the elution unit installed in the reaction tank and introduced into the reaction tank. While reusing this active ingredient, fluorine contained in wastewater can be treated.

The present invention further provides a wastewater treatment equipment for treatment of fluorine wastewater which contains hydrogen peroxide or organic matter, comprising: an acid raw water tank; a recycling tank having a precipitation section, to which returned sludge is introduced; a reaction tank; a poly aluminium chloride coagulating tank; a polymer coagulant coagulating tank; a precipitating tank; and an elution unit installed in the reaction tank, into which returned sludge from the precipitating tank is introduced, in which a separate reaction from a reaction in the reaction tank is carried out to elute a chemical from reactants and unreacted chemicals contained in the returned sludge, and from which the eluted chemical is introduced into the reaction tank.

According to this invention, fluorine contained in wastewater can be treated in the recycling tank having the precipitation section while recycling ingredients in the returned sludge. Furthermore, reactants and unreacted chemicals can be eluted from the returned sludge in the elution unit installed in the reaction tank and reused for wastewater treatment.

Hydrogen peroxide contained in fluorine wastewater can be treated by anaerobic microorganisms having reducibility propagated in the recycling tank into which the returned sludge is introduced. Since the precipitating tank and the recycling tank are maintained in an anaerobic state, anaerobic microorganisms are propagated in the returned sludge with the passage of time. Thus, hydrogen peroxide can be treated by anaerobic microorganisms having reducibility.

Organic matter in the wastewater can be treated by anaerobic microorganisms propagated in the recycling tank into which the returned sludge is introduced.

The present invention still further provides a wastewater treatment equipment for treatment of fluorine wastewater which contains hydrogen peroxide or organic matter, comprising: an acid raw water tank; a recycling tank having a precipitation section, to which returned sludge is introduced; a reaction tank; a first polymer coagulant coagulating tank; a first precipitating tank from which sludge is returned to the recycling tank; a poly aluminium chloride coagulating tank; a second polymer coagulant coagulating tank; a second precipitating tank; and an elution unit installed in the reaction tank, into which returned sludge from the second precipitating tank is introduced, in which a separate reaction from the reaction in the reaction tank is carried out to elute a chemical from reactants and unreacted chemicals contained in the returned sludge, and from which the eluted chemical is introduced into the reaction tank.

According to this invention, fluorine can be highly treated in a stable manner since fluorine contained in the wastewater is treated by two-stage coagulo-precipitation by using the recycling tank, the reaction tank, and the first polymer coagulant coagulating tank and the poly aluminium chloride coagulating tank and the second polymer coagulant coagulating tank.

Since aluminium hydroxide sludge is returned from the second precipitating tank to the separate reaction unit in the interior of the reaction tank, aluminium hydroxide can be reused to reduce the consumption of poly aluminium chloride. Also, since sludge containing unreacted calcium hydroxide is returned from the first precipitating tank to the recycling tank, unreacted calcium hydroxide can be reused to reduce consumption of calcium hydroxide.

Hydrogen peroxide contained in fluorine wastewater can be treated by anaerobic microorganisms having reducibility propagated in the recycling tank having the precipitation section into which the returned sludge is introduced.

Organic matter contained in fluorine wastewater can be treated by anaerobic microorganisms having reducibility propagated in the recycling tank having the precipitation section into which the returned sludge is introduced.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 10A and 10B are timing charts of a wastewater treatment equipment according to the ninth embodiment;

DETAILED DESCRIPTION OF THE PREFERRED EMBODIMENTS

The present invention is described in detail below with reference to embodiments shown in drawings.

Figure 1:
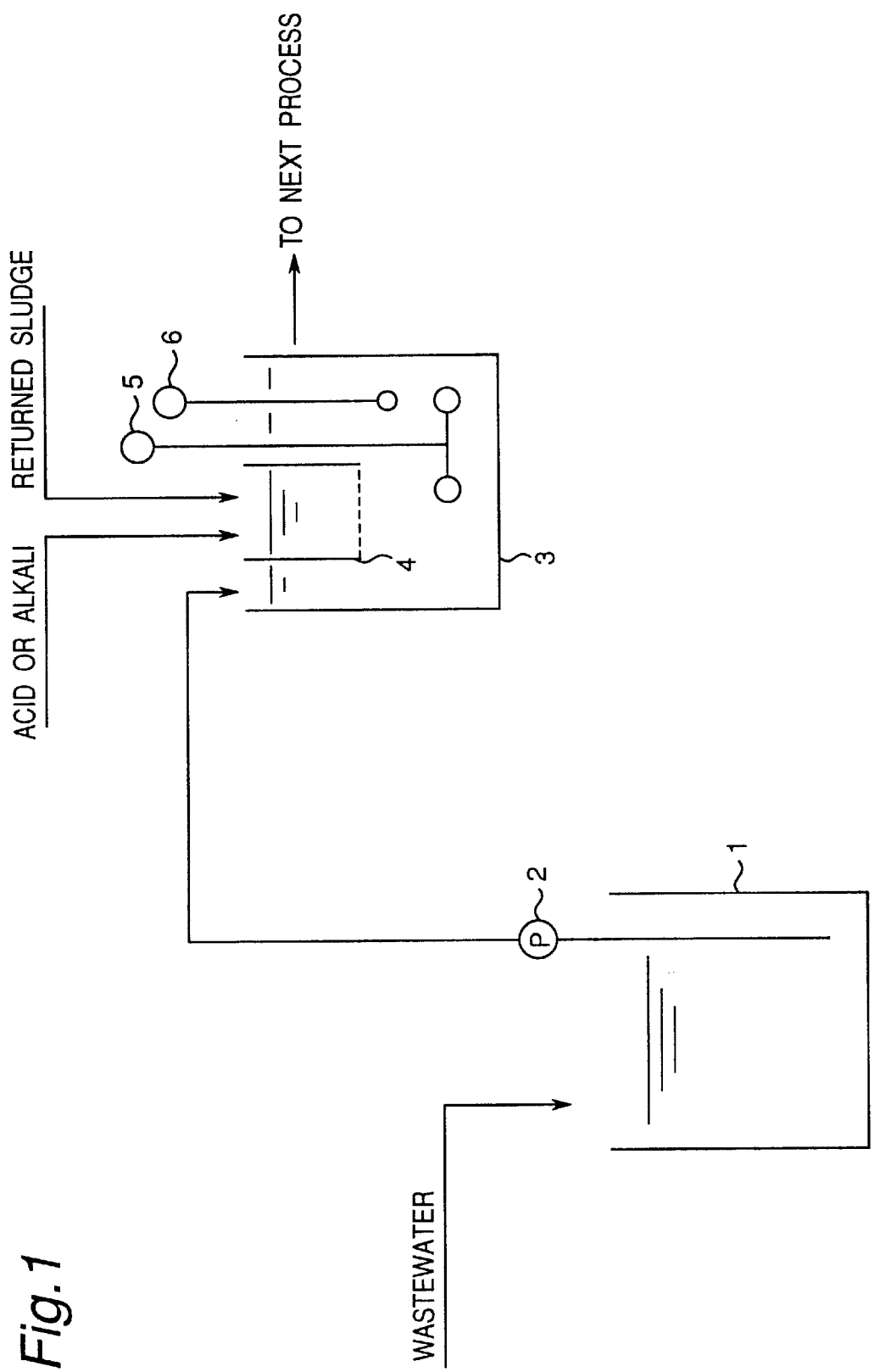
FIG. 1 is a diagram showing a wastewater treatment equipment according to a first embodiment of the invention.

FIG. 1 shows a wastewater treatment equipment according to a first embodiment of the invention.

In the first embodiment, wastewater is introduced into a raw water tank 1. The wastewater introduced into the raw water tank 1 is stored for a certain period of time so as to adjust the wastewater in some degrees. The adjusted wastewater is introduced into a reaction tank 3 by a raw water pump 2. In an interior of the reaction tank 3, a separate reaction unit 4 is installed. A separate reaction from the one in the reaction tank 3 is carried out in the separate reaction unit 4. This separate reaction unit 4 has a mesh-like structure at a bottom portion 4A thereof so that the separate reaction unit 4 is communicated with the interior of the reaction tank 3. An acid or alkali as a chemical and returned sludge are introduced into the separate reaction unit 4 in the interior of the reaction tank 3. The return sludge is from sludge precipitated in a precipitating tank (not shown in FIG. 1) that is subsequently installed in a chemical wastewater treatment equipment.

The sludge precipitated in the precipitating tank in the chemical wastewater treatment equipment contains reactants and unreacted chemicals. In this embodiment, an acid or alkali along with the returned sludge are introduced into the separate reaction unit 4 installed in the reaction tank 3 so as to treat wastewater.

In more detail, returned sludge and an acid or alkali are introduced into the separate reaction unit 4 and then active ingredients are regenerated from the returned sludge by the acid or alkali and introduced from a bottom 4A of the separate reaction unit 4 into the reaction tank 3. Consequently, wastewater introduced from the raw water tank 1 into the reaction tank 3 is treated by the regenerated ingredients introduced from the separate reaction unit 4. After all, the wastewater in the reaction tank 3 is treated by the acid or alkali as well as the ingredients that has been regenerated from the returned sludge.

A rapid reaction tank agitator 5 in the reaction tank 3 has a role of smoothly promoting a chemical reaction in the reaction tank 3. A pH meter 6 is also installed in the reaction tank 3 to sense pH of wastewater in the reaction tank 3 so that an optimal pH condition for regenerating active ingredients from the returned sludge can be obtained. As a specific example, when returned sludge contains aluminium or iron, aluminium or iron is eluted from the returned sludge by an acid or alkali and becomes aluminium ions or iron ions, which effectively act on reaction. Consequently, aluminium ions or iron ions regenerated from the returned sludge are recycled and effectively act on wastewater treatment.

More specifically, poly aluminium chloride and ferric chloride are representative coagulants in the field of wastewater treatment. A large amount of these coagulants are used in various areas of wastewater treatment. Coagulants used in various areas of wastewater treatment such as poly aluminium chloride, ferric chloride and the like are generally added in a large amount to a reaction tank in a wastewater treatment equipment (reaction tank 3 in the first embodiment). Therefore, reactants derived from the coagulants, hydroxide, unreacted poly aluminium chloride and unreacted ferric chloride are present in sludge generated in the precipitating tank and generate sludge. The sludge containing reactants derived from the coagulants, hydroxide and unreacted coagulants is introduced as returned sludge into the separate reaction 4. Then, aluminium ions or iron ions as active ingredients are eluted from the returned sludge and recycled (regenerated) in the reaction tank 3 for wastewater treatment again.

In general, coagulants such as poly aluminium chloride, aluminium sulfate, ferric chloride and ferrous sulfate are often added to sludge excessively. Therefore, these substances can be easily recycled.

Although active ingredients are generally regenerated from reactants derived from coagulants, hydroxide and unreacted coagulants, these are not regenerated from reactants which are insoluble in an acid or alkali. A typical insoluble reactant is calcium fluoride.

Figure 2:
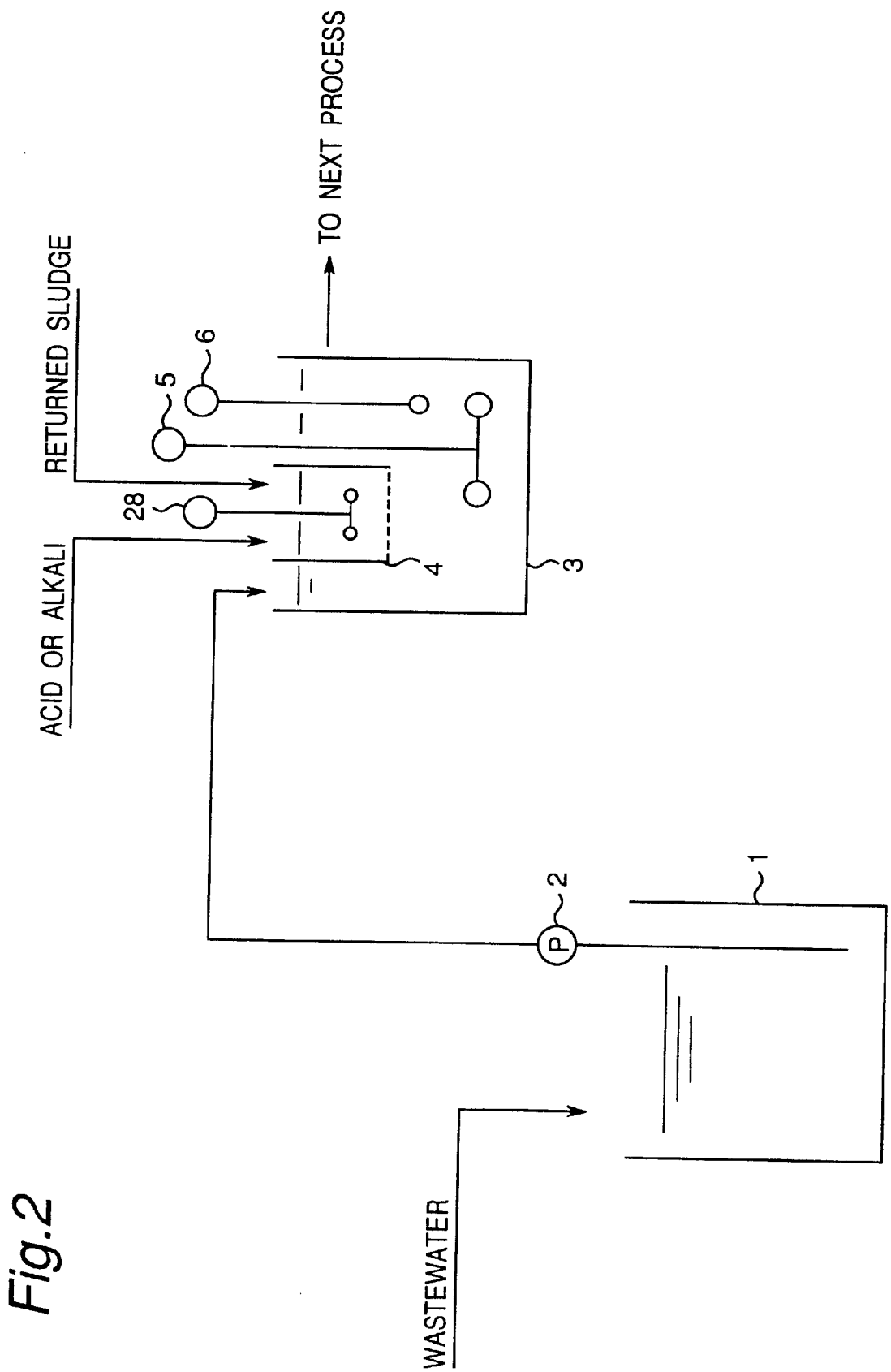
FIG. 2 is a diagram showing a wastewater treatment equipment according to a second embodiment of the invention.

FIG. 2 shows a wastewater treatment equipment according to a second embodiment of the invention. Like components are designated by like reference numerals in the first embodiment and detailed description thereof is omitted. It should be noted that this also applies to third through fifteenth embodiments described blow.

The second embodiment is different from the above-described first embodiment only in the following point. That is, although no agitator is installed in the separate reaction unit 4 shown in FIG. 1 in the first embodiment, a rapid reaction unit agitator 28 is installed in the separate reaction unit 4 shown in FIG. 2 in the second embodiment. Reaction in the separate reaction unit 4 is made more efficient because of the rapid reaction unit agitator 28. Although a slow agitator can make a certain effect, a rapid agitator is more efficient. Particularly, when returned sludge has a high sludge concentration or the returned sludge easily coagulates, the rapid agitator is effective.

Figure 3:
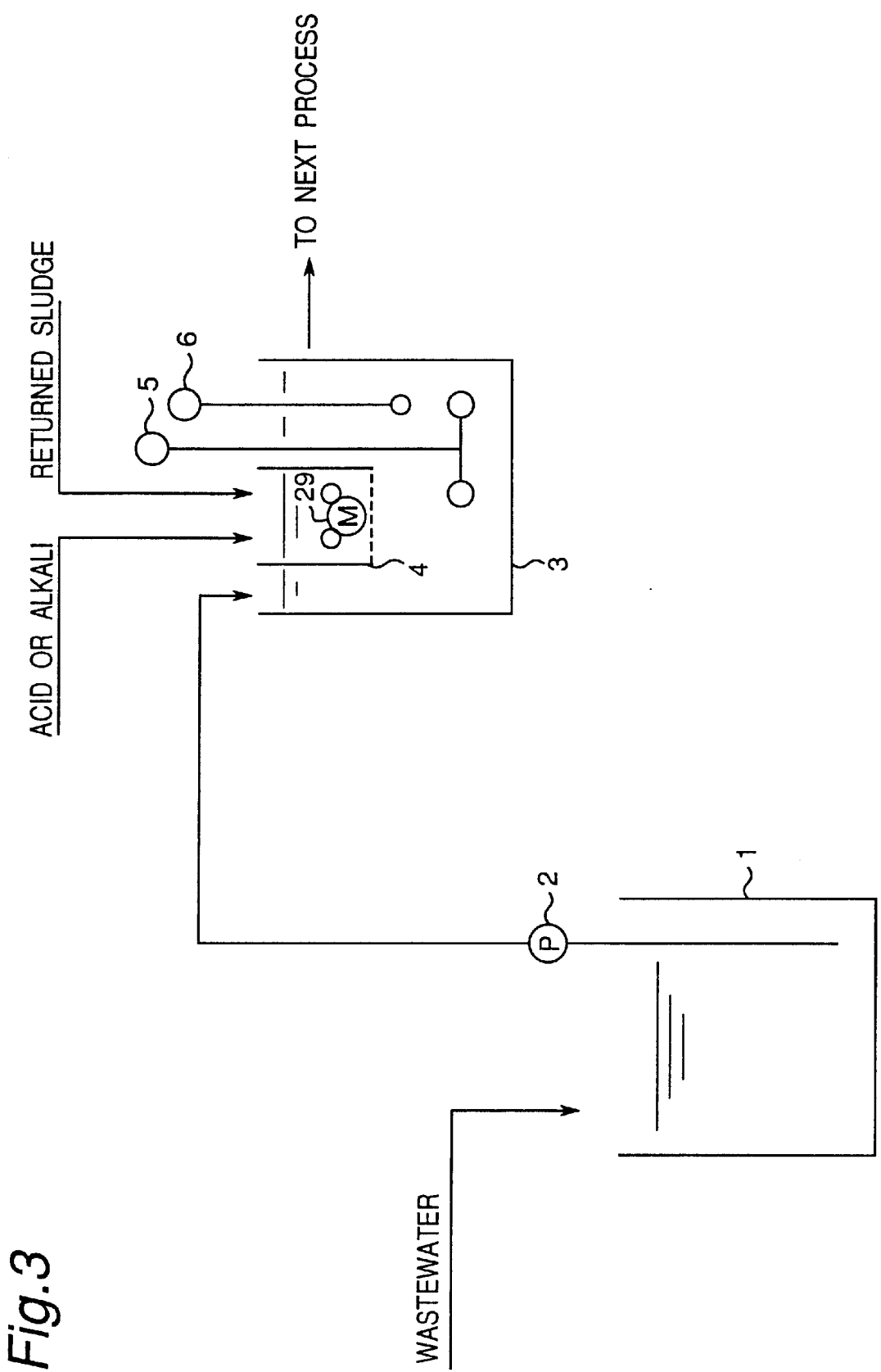
FIG. 3 is a diagram showing a wastewater treatment equipment according to a third embodiment of the invention.

FIG. 3 shows a wastewater treatment equipment according to a third embodiment of the invention.

The third embodiment is different from the above-described first embodiment in the following point. That is, although no submersible agitator is installed in the separate reaction unit 4 shown in FIG. 1 in the first embodiment, a submersible agitator 29 is installed in the separate reaction unit 4 shown in FIG. 3 in the third embodiment.

Since the submersible agitator 29 is installed in the separate reaction unit 4, reaction in the separate reaction unit 4 is made more efficient. Particularly, when returned sludge has a high sludge concentration or the returned sludge easily coagulates, the submersible agitator is effective.

The submersible agitator 29 is also suitable in a case where noise from a motor of the rapid agitator is not permissible. Even though the upper portion of the separate reaction unit 4 is complicated with piping or the like, the submersible agitator does not make it more complicated since its mechanical portion is submersible.

Figure 4:
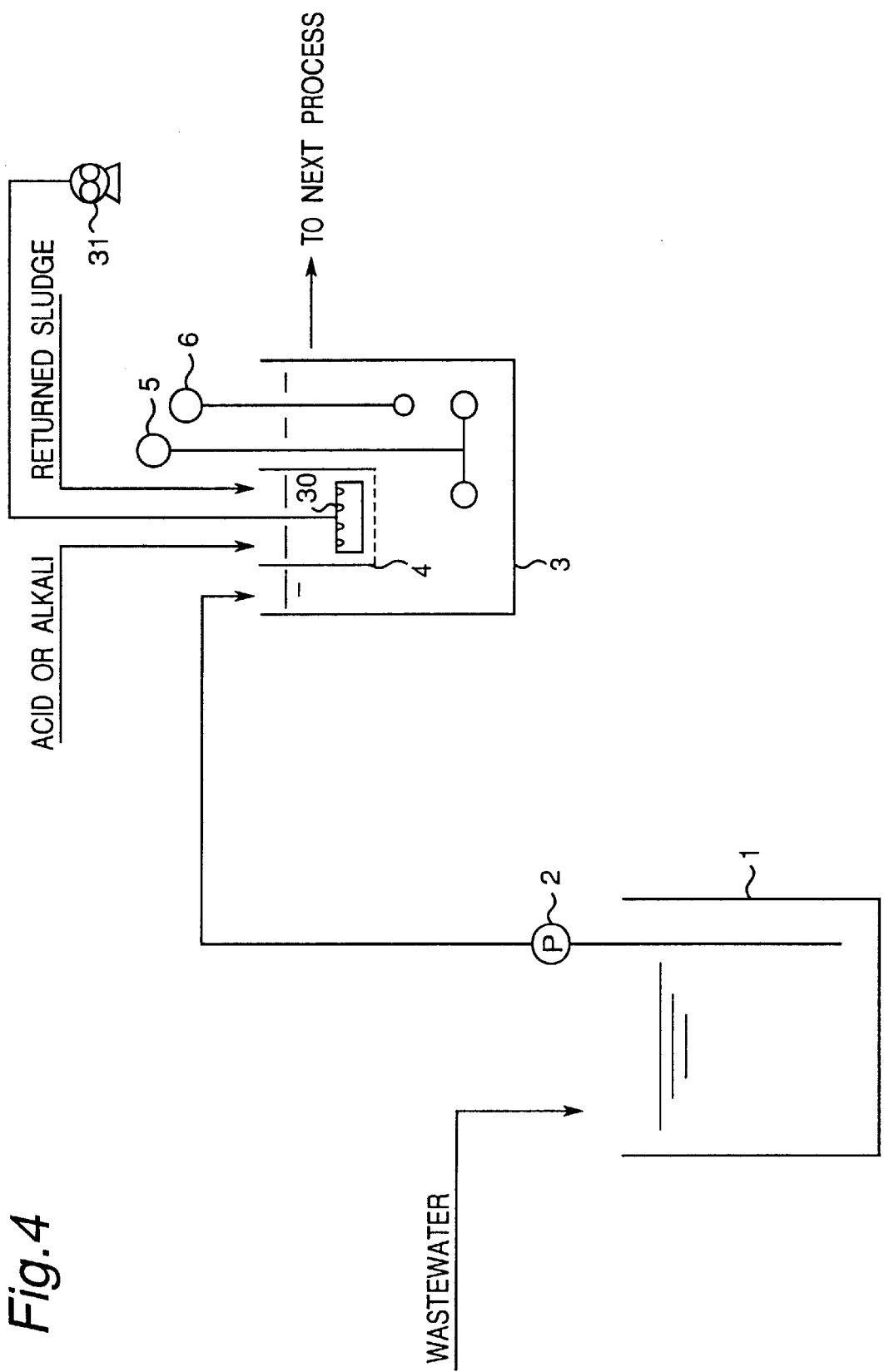
FIG. 4 is a diagram showing a wastewater treatment equipment according to a fourth embodiment of the invention.

FIG. 4 shows a wastewater treatment equipment according to a fourth embodiment of the invention.

The fourth embodiment is different from the above-described first embodiment only in the following point. That is, although no agitator is installed in the separate reaction unit 4 shown in FIG. 1 in the first embodiment, the diffusing pipe 30 is installed in the separate reaction unit 4 shown in FIG. 4 in the fourth embodiment. Air generated in a blower 31 is discharged from the diffusing pipe 30 so as to carry out agitation by aeration in the separate reaction unit 4.

Reaction in the separate reaction unit 4 is made more efficient because the diffusing pipe 30 is installed in the separate reaction unit 4 and the interior of the reaction unit 4 is agitated by aeration by using air discharged from the diffusing pipe 30. Particularly, when returned sludge has a high sludge concentration or the returned sludge easily coagulates, this agitation is effective. Since the diffusing pipe 30 and the piping are the only equipment installed in the separate reaction unit 4, no mechanical trouble occurs unlike in a case an agitator is used.

Figure 5:
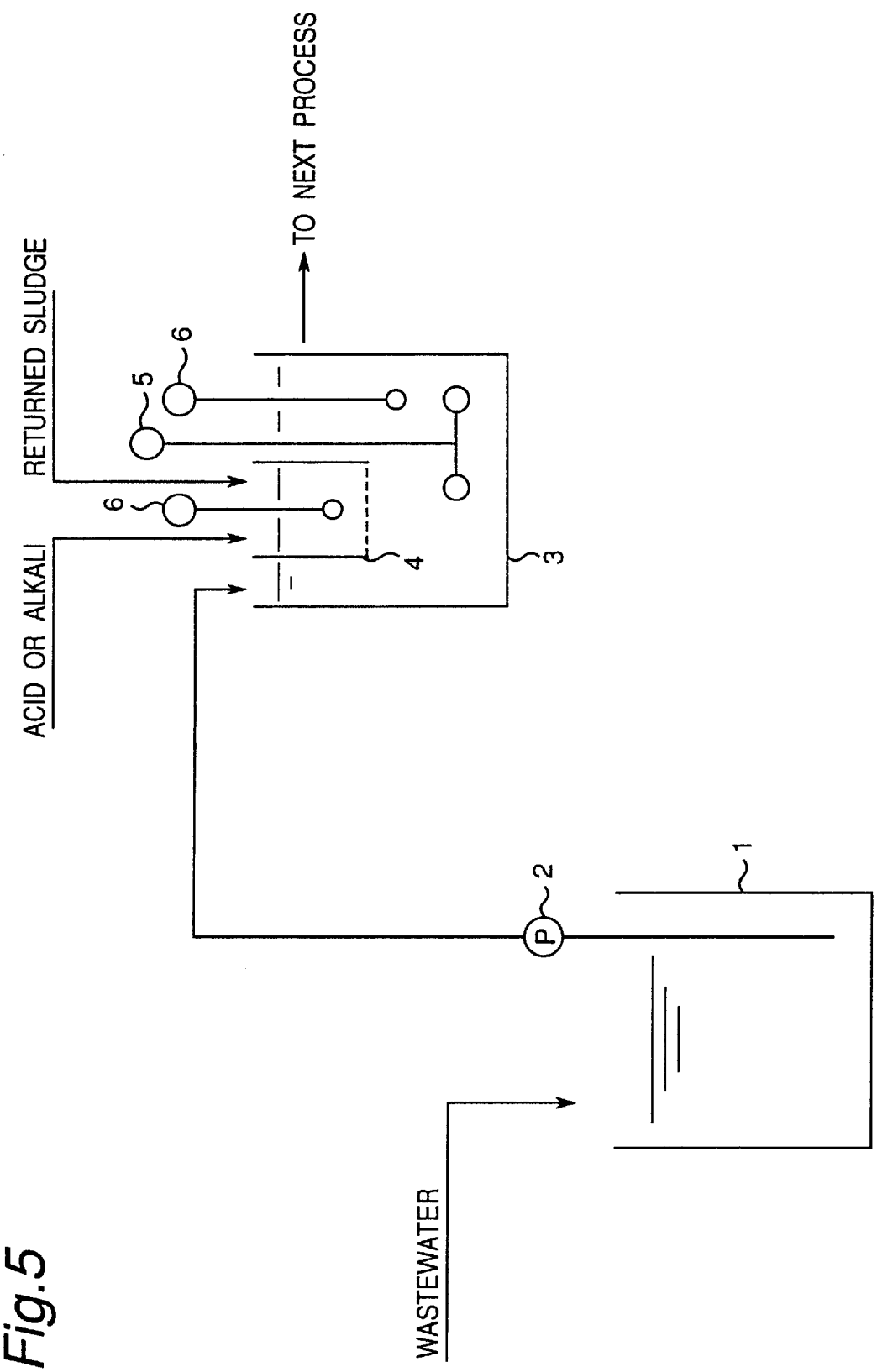
FIG. 5 is a diagram showing a wastewater treatment equipment according to a fifth embodiment of the invention.

FIG. 5 shows a wastewater treatment equipment according to a fifth embodiment of the invention.

The fourth embodiment is different from the above-described first embodiment only in the following point. That is, although no pH meter is installed in the separate reaction unit 4 shown in FIG. 1 in the first embodiment, a pH meter 6 is installed in the separate reaction unit 4 shown in FIG. 5 in the fifth embodiment.

Therefore, reaction in the separate reaction unit 4 can be controlled to obtain optimal pH. Therefore, active ingredients or the like are regenerated more efficiently. In particular, since pH control is important to elute active ingredients from the returned sludge, this pH control is effective. For example, in a case of returned sludge containing aluminium, the optimal pH is in the range from 11 to 12.

Figure 6:
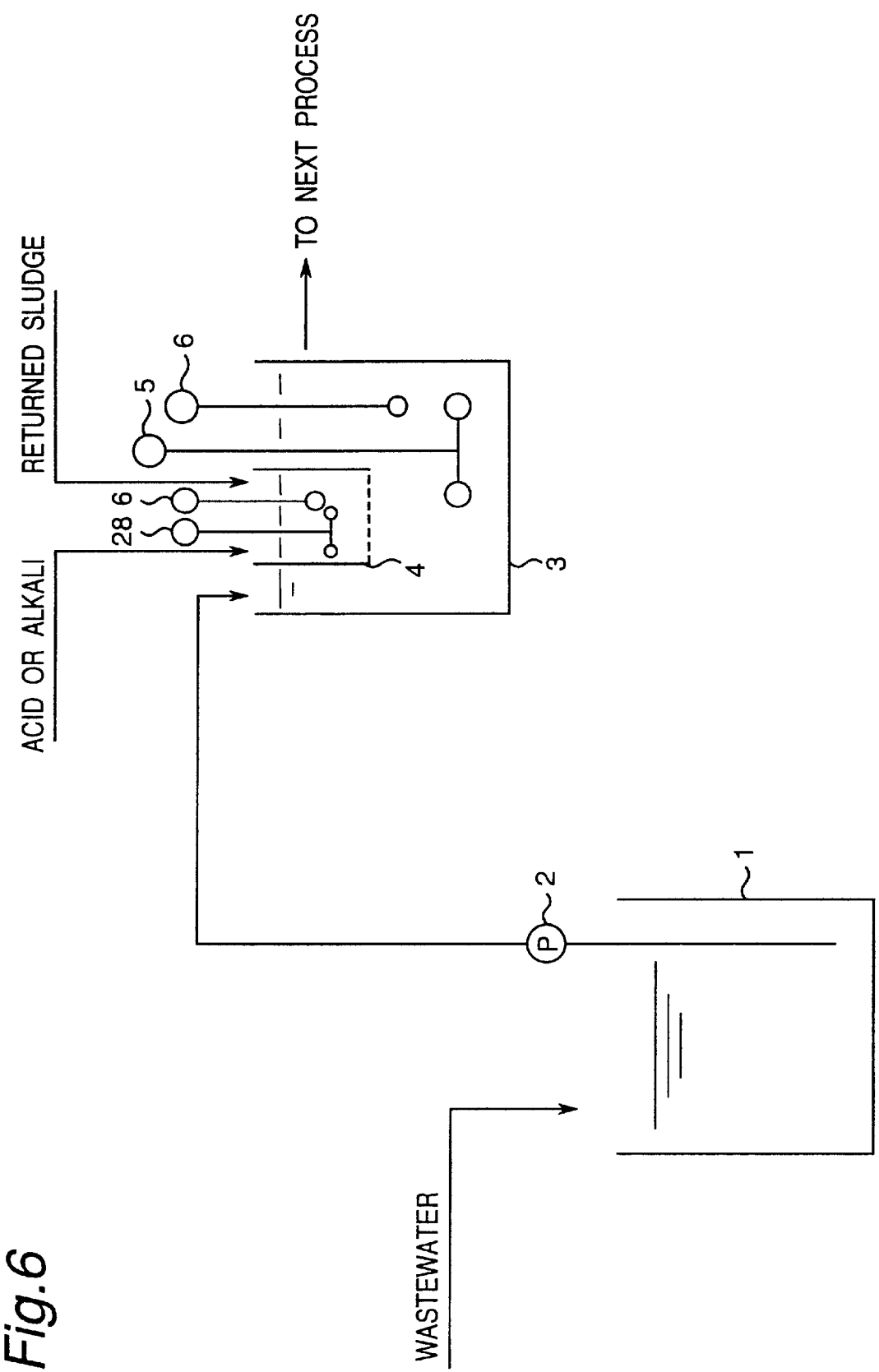
FIG. 6 is a diagram showing a wastewater treatment equipment according to a sixth embodiment of the invention.

FIG. 6 shows a wastewater treatment equipment according to a sixth embodiment of the invention.

The sixth embodiment is different from the above-described first embodiment only in the following point. That is, although neither an agitator nor a pH meter is installed in the separate reaction unit 4 shown in FIG. 1 in the first embodiment, a rapid reaction unit agitator 28 and a pH meter 6 are installed in the separate reaction unit 4 shown in FIG. 6 in the sixth embodiment.

Therefore, reaction in the separate reaction unit 4 can be rapidly controlled to obtain optimal pH and thus a reaction becomes more efficient. In particular, since control of an agitation state and pH is important to elute active ingredients from the returned sludge, considerable effects can be expected. For example, in a case of returned sludge containing aluminium, the optimal pH is in the range from 11 to 12.

Figure 7:
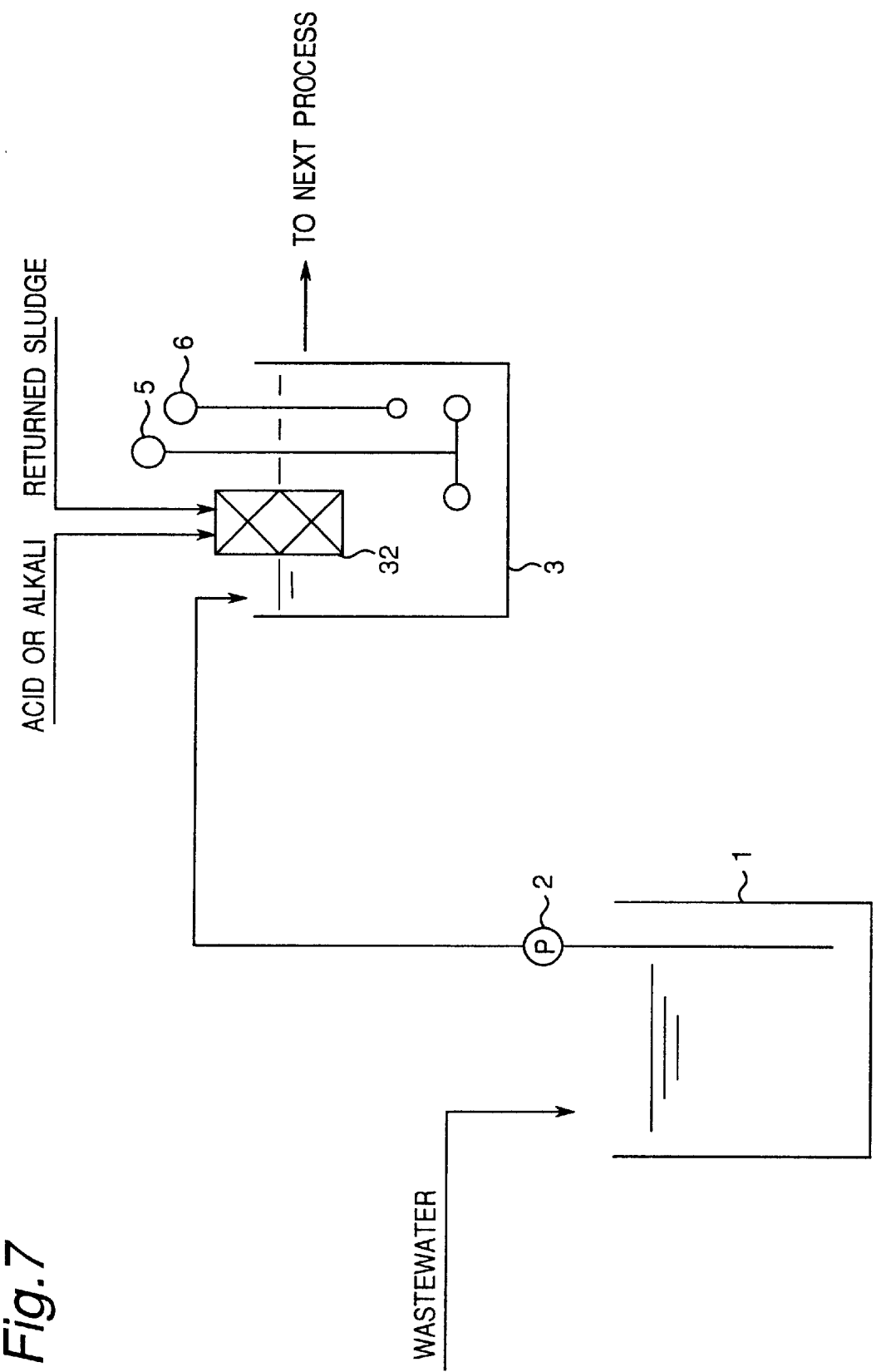
FIG. 7 is a diagram showing a wastewater treatment equipment according to a seventh embodiment of the invention.

FIG. 7 shows a wastewater treatment equipment according to a seventh embodiment of the invention.

The seventh embodiment is different from the above-described first embodiment only in the following point. That is, in the seventh embodiment, a line mixer 32 is provided in the reaction tank 3 as an alternative of the reaction unit 4 shown in FIG. 1.

Therefore, a reaction between an acid or alkali and the returned sludge is carried out in the line mixer 32. In particular, since the line mixer 32 has a small capacity, influence of the acid or alkali is more direct in the line mixer 32 and thereby active ingredients are reliably regenerated from the returned sludge by the acid or alkali. Merits in employing a line mixer 32 include that a line mixer 32 can agitate an acid or alkali and returned sludge without a motive power for agitation.

As a line mixer 32, a commercially available product in general use can be employed. However, selection requires sufficient care since the interior of the line mixer with small capacity is blocked up by returned sludge.

Figure 8:
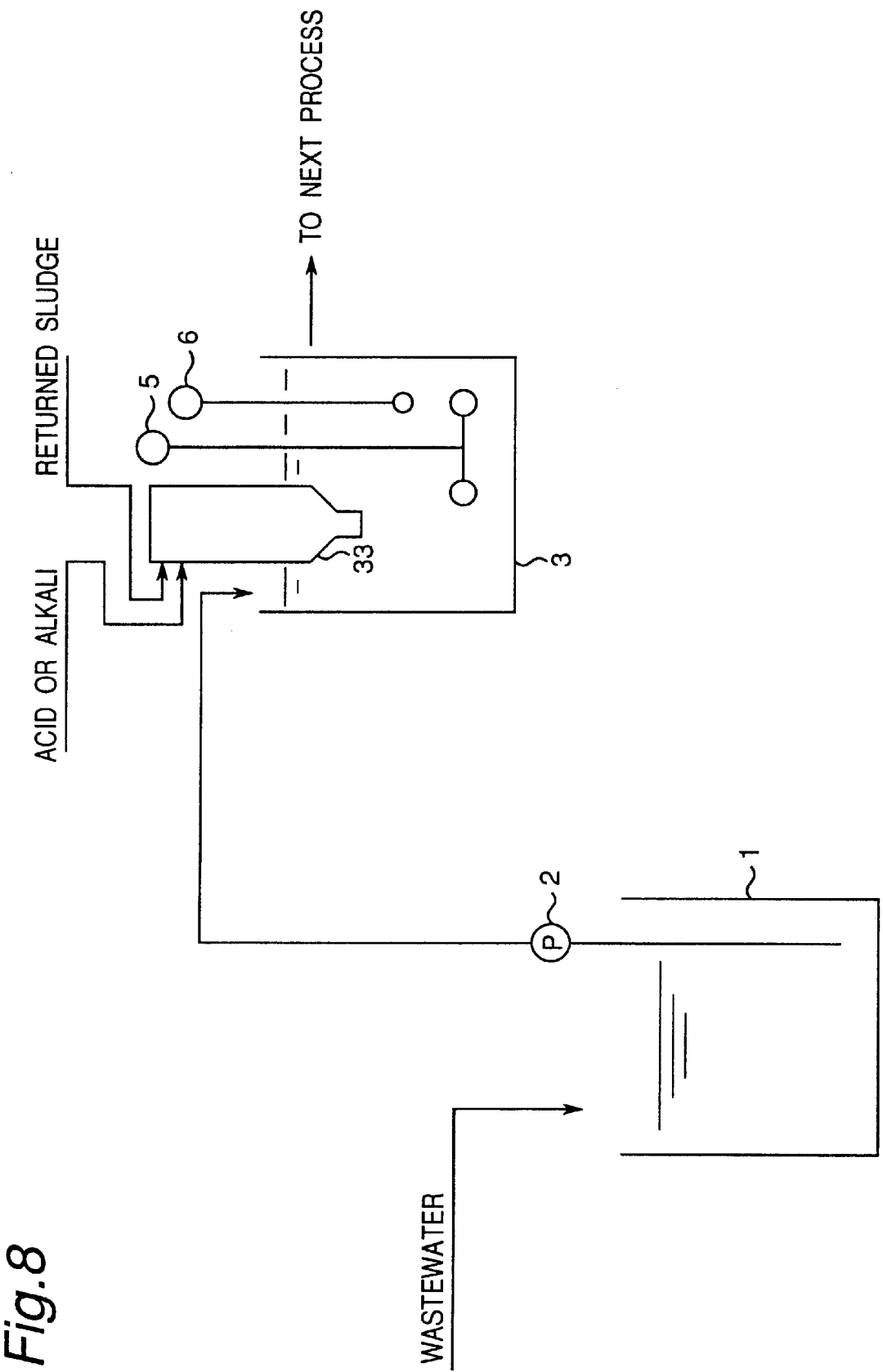
FIG. 8 is a diagram showing a wastewater treatment equipment according to an eighth embodiment of the invention.

FIG. 8 shows a wastewater treatment equipment according to an eighth embodiment of the invention.

The eighth embodiment is different from the above-described first embodiment only in the following point. That is, in the eighth embodiment, a cyclone 33 is provided in the reaction tank 3 as an alternative of the reaction unit 4 shown in FIG. 1.

Therefore, a reaction between an acid or alkali and the returned sludge is carried out in the cyclone 33.

Particularly since an acid or alkali and the returned sludge are directly reacted in the cyclone 33 in a state that a swirling water flow is present, active ingredients are reliably regenerated from the returned sludge by the acid or alkali.

In general, a cyclone, which is a device utilizing a centrifugal force, can regenerate active ingredients by reacting an acid or alkali and returned sludge by this centrifugal force.

By employing a cyclone 33, an acid or alkali and returned sludge can be agitated by the cyclone 33 without a motive power for agitation. As a cyclone 33, a commercially available product in general use can be employed.

Figure 9:
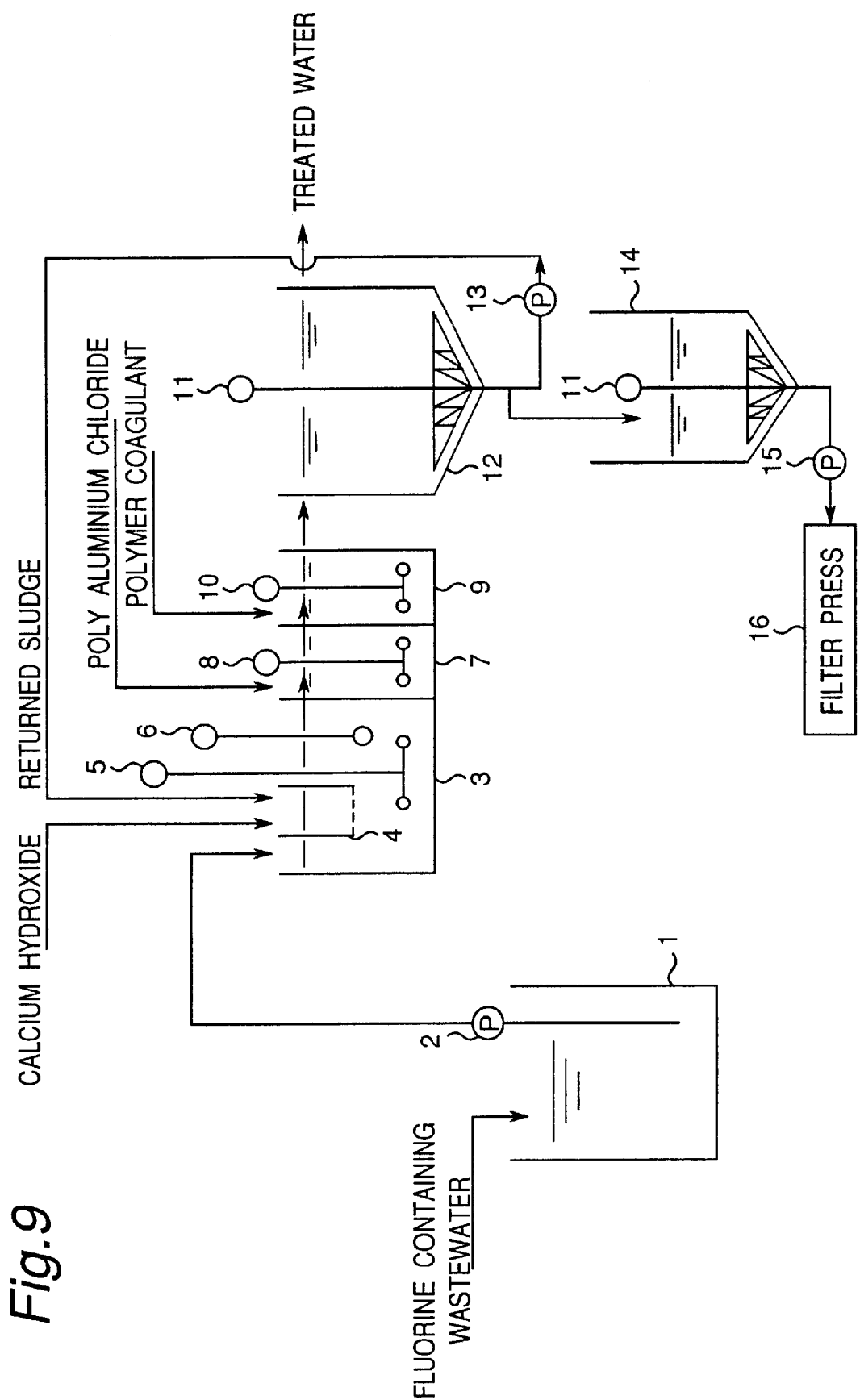
FIG. 9 is a diagram showing a wastewater treatment equipment according to a ninth embodiment of the invention.

FIG. 9 shows a wastewater treatment equipment according to a ninth embodiment of the invention.

In FIG. 9, fluorine containing wastewater is introduced into a raw water tank (first water tank) 1.

The fluorine containing wastewater stored in the raw water tank 1 for a certain period of time is introduced to a separate reaction unit 4 installed in a reaction tank 3 by a raw water pump 2. Sludge precipitated in a precipitating tank (fifth water tank) 12 is introduced into this separate reaction unit 4 from the top as returned sludge.

The fluorine containing wastewater is introduced from the raw water tank 1 into the reaction tank 3 surrounding the separate reaction unit 4 by the raw water pump 2. Here, calcium hydroxide added into the separate reaction unit 4 moves towards the lower portion of the separate reaction unit 4 while regenerating active ingredients in the returned sludge, then further from a mesh-like bottom portion 4A of the separate reaction unit 4 into the interior of the reaction tank 3. Then, calcium in calcium hydroxide is reacted with fluorine in fluorine containing wastewater to form hardly soluble fine calcium fluoride. Fluorine is treated by forming hardly soluble fine calcium fluoride by fluorine in the fluorine containing wastewater.

At the same time, pH is increased in the separate reaction unit 4 by adding calcium hydroxide. Aluminium fluoride and aluminium hydroxide, which are part of the returned sludge, are regenerated and become aluminium ions. Aluminium ions exhibits the same coagulating action as that of poly aluminium chloride as a chemical. Thus, fine calcium fluoride formed in reaction tank 3 outside the separate reaction unit 4 is coagulated and becomes a large floc of hydroxide. Table 1 shows the relationship between pH in the separate reaction unit 4 and the concentration of aluminium ions eluted from the returned sludge.

TABLE 1

| pH | Concentration of aluminium ions eluted from returned sludge (mg/l) |
|---|---|
| 6.3 | 6.0 |
| 9.3 | 14.0 |
| 11.3 | 82.0 |
| 11.9 | 340.0 |
| 12.5 | 480.0 |

Aluminium can be eluted from aluminium hydroxide sludge by adjusting to pH 11 or higher in the separate reaction unit 4.

A rapid reaction tank agitator 5 for accelerating a coagulation reaction by regenerated aluminium ions and a pH meter 6 for measuring pH in the reaction tank 3 are installed in the reaction tank 3. The wastewater moved from the reaction tank 3 flows into a poly aluminium chloride coagulating tank (third water tank) 7 and new poly aluminium chloride is added thereto so that the remaining fine calcium fluoride is coagulated. A coagulating tank rapid agitator 8 is installed in the poly aluminium chloride coagulating tank (third water tank) 7 to accelerate the coagulation reaction.

Then, the wastewater moved from the third water tank 7 is moved to a polymer coagulant coagulating tank (fourth water tank) 9, in which a slow coagulating tank agitator 10 is installed. A polymer coagulant is added so that calcium fluoride becomes a more stable, large floc.

The wastewater moved from the fourth water tank 9 is introduced into a precipitating tank (fifth water tank) 12, in which a gathering device 11 is installed. Then, calcium fluoride floc, aluminium fluoride floc, aluminium hydroxide floc and supernatant water are separated into solids and liquid while calcium fluoride floc, aluminium fluoride floc and aluminium hydroxide floc are precipitated at the bottom of a precipitating tank 12.

The precipitated calcium fluoride floc, aluminium fluoride floc and aluminium hydroxide floc are introduced as returned sludge into the separate reaction unit 4 installed in the reaction tank 3 by a fifth water tank returning pump 13. Since calcium hydroxide is added into the separate reaction unit 4, pH is 11 or higher in the separate reaction unit 4. Aluminium fluoride floc and aluminium hydroxide floc are regenerated and become aluminium ions and fluorine ions. Fluorine ions are reacted with calcium ions of calcium hydroxide and become stable calcium fluoride. On the other hand, since the regenerated aluminium ions are moved from the mesh-like bottom portion 4A of the separate reaction unit 4, pH becomes closer to a neutral region of pH 11 or less. The regenerated ions become aluminium fluoride and aluminium hydroxide floc again and exhibit actions as coagulants in the reaction tank 3.

About 10% of sludge coagulated and moved from the precipitating tank (fifth water tank) 12 flows into a thickening tank (sixth water tank) 14 while the remaining about 90% is moved into the separate reaction unit 4 as returned sludge.

Thus, sludge containing calcium fluoride floc, aluminium fluoride floc, aluminium hydroxide floc and unreacted calcium hydroxide is circulated as returned sludge by the fifth water tank returning pump 13 between the reaction tank 3, in which the separate reaction unit 4 is installed and the precipitating tank 12. Consequently, the following phenomena (1) to (3) occur.

(1) Unreacted calcium hydroxide decreases unlimitedly.
(2) Aluminium in aluminium fluoride and aluminium hydroxide is reused and circulated in the wastewater treatment equipment at all times.
(3) Calcium fluoride sludge chemically stable as reactant is the only sludge precipitated in the precipitating tank 12.

Subsequently, the sludge containing calcium fluoride as a main constituent is introduced into the thickening tank (sixth water tank) 14 having the gathering device 11 and concentrated with the passage of time. The concentrated sludge containing calcium fluoride as a main constituent is dehydrated by a filter press 16. The water content of a dehydrated cake dehydrated by the filter press 16 depends on operation control to some extent, but is about 60%.

FIG. 10A shows a timing chart of each water tank in the ninth embodiment in a case where the fluorine concentration in fluorine containing wastewater is normal. FIG. 10B shows a timing chart of each water tank in a case where the fluorine concentration in fluorine containing wastewater is low.

Figure 11:
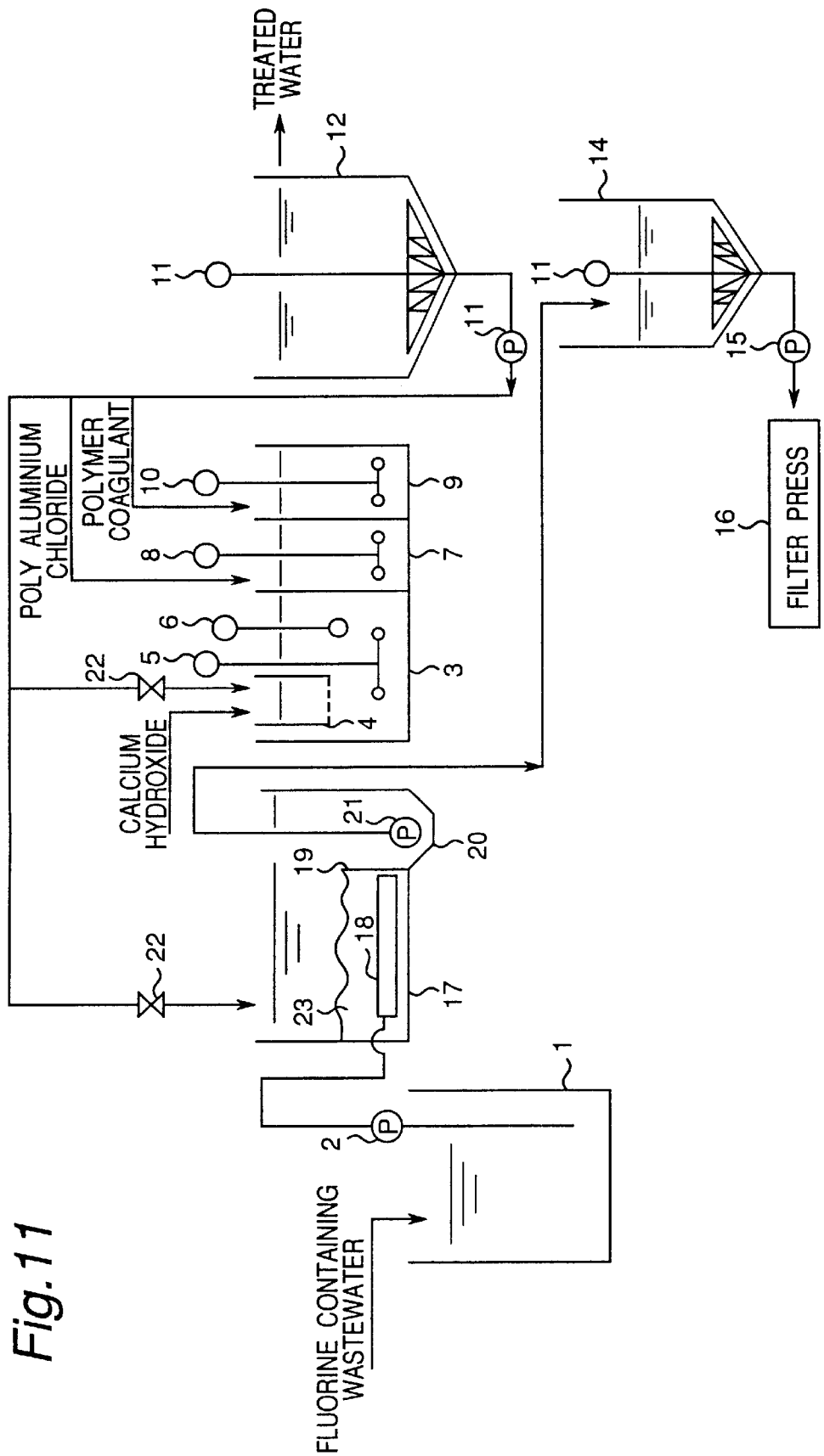
FIG. 11 is a diagram showing a wastewater treatment equipment according to a tenth embodiment of the invention.

FIG. 11 shows a wastewater treatment equipment according to tenth embodiment of the invention.

The tenth embodiment is different from the above-described ninth embodiment only in the following point. In the tenth embodiment, a recycling tank 17 is installed between the first water tank 1 and the reaction tank 3 in the ninth embodiment shown in FIG. 9.

The tenth embodiment is different from the above-described ninth embodiment only in that the recycling tank 17 is installed and thereby the processing flow in inflow piping, outflow piping and the like related to the recycling tank 17 is different.

The recycling tank 17 is partitioned into a precipitation section 20 and a portion other than the precipitation section 20 by an isolating wall 19. A precipitation section pump 21 is installed in the precipitation section 20 so that calcium fluoride sludge precipitated in the precipitation section 20 is introduced into the thickening tank (sixth water tank) 14.

Fluorine containing wastewater is introduced into the recycling tank 17 by an introducing pipe 18 in the lower portion of the recycling tank 17. When a valve 22A is open, returned sludge containing calcium fluoride floc, aluminium fluoride floc and aluminium hydroxide floc, unreacted calcium hydroxide and unreacted polymer coagulants is introduced from a precipitating tank (fifth water tank) 12 into the recycling tank 17 in advance and stored in the lower portion of the recycling tank 17 as a sludge zone 23.

On the other hand, when a valve 22B is open, returned sludge containing calcium fluoride floc, aluminium fluoride floc and aluminium hydroxide floc, unreacted calcium hydroxide and unreacted polymer coagulants is introduced from the precipitating tank (fifth water tank) 12 into the separate reaction unit 4 installed in the reaction tank 3, in which active ingredients are eluted and recycled.

When fluorine containing wastewater is introduced into the recycling tank 17, fluorine in wastewater is reacted with calcium in unreacted calcium hydroxide in the sludge zone 23 to form a chemically stable fine calcium fluoride. Then, the fine calcium fluoride is coagulated as a stable, larger floc by aluminium ions from aluminium fluoride floc and aluminium hydroxide floc and unreacted polymer coagulants, moved to the precipitation section 20 and precipitated. The precipitated calcium fluoride sludge is introduced into a thickening tank (sixth water tank) 14 by a precipitation section pump 21. Supernatant of the fluorine containing wastewater treated in the recycling tank 17 is introduced into the reaction tank 3 and treated as in the case of the ninth embodiment.

Figure 12:
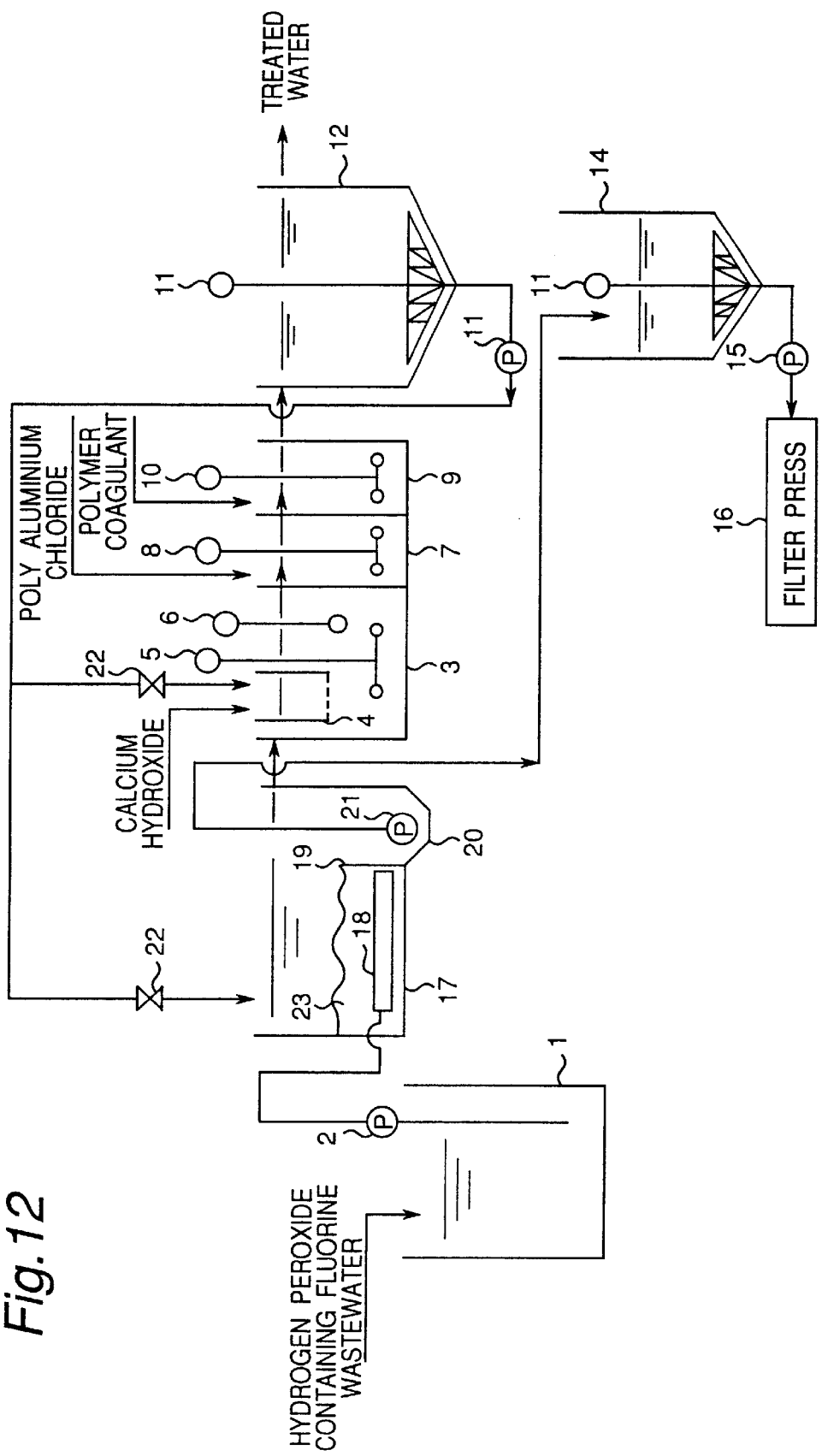
FIG. 12 is a diagram showing a wastewater treatment equipment according to a eleventh embodiment of the invention.

FIG. 12 shows a wastewater treatment equipment according to an eleventh embodiment of the invention.

The eleventh embodiment is different from the above-described tenth embodiment only in the contents of an influent. Therefore, like components are designated by like reference numerals in the tenth embodiment and detailed description thereof is omitted.

While an influent is fluorine containing wastewater in the tenth embodiment, the influent is hydrogen peroxide containing fluorine wastewater in the eleventh embodiment.

Anaerobic microorganisms are propagated in sludge containing calcium fluoride floc, aluminium fluoride floc, aluminium hydroxide floc, unreacted calcium hydroxide and unreacted polymer coagulants in the sludge zone 23 with the passage of time. Since anaerobic microorganisms have a reductive action, hydrogen peroxide contained in wastewater can be treated by this reductive action.

Since sludge in the upper portion of the sludge zone 23 is distant from the introducing pipe 18 as compared with sludge in the lower portion, its liquid state is close to neutral and thereby anaerobic microorganisms can be propagated. However, sludge in the lower portion of the sludge zone 23 is influenced by acidity of hydrogen peroxide containing fluorine wastewater and thereby anaerobic microorganisms cannot be easily propagated. Hydrogen peroxide contained in fluorine wastewater is always treated in the upper portion of the sludge zone 23, where anaerobic microorganisms are propagated.

Figure 13:
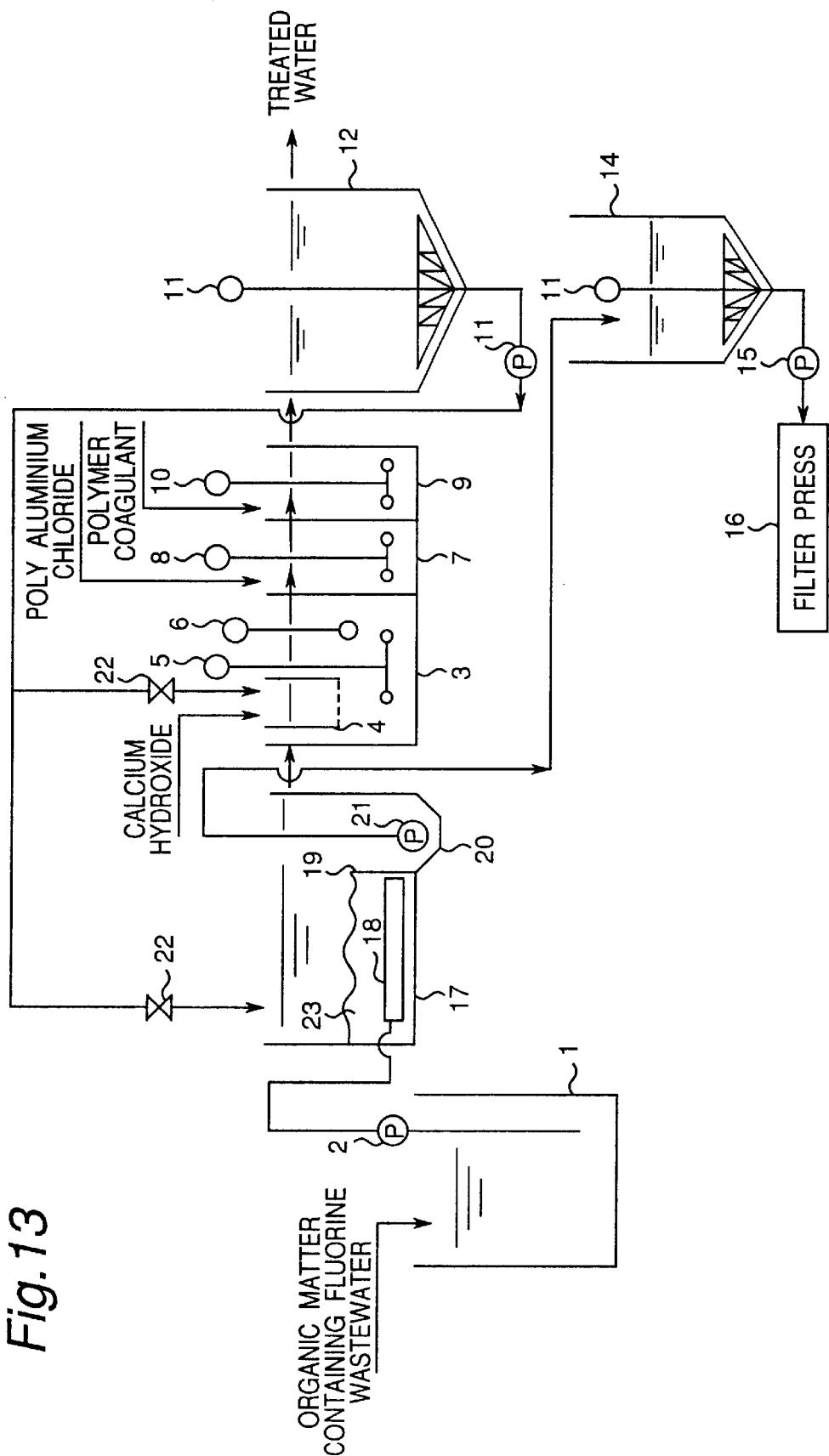
FIG. 13 is a diagram showing a wastewater treatment equipment according to a twelfth embodiment of the invention.

FIG. 13 shows a wastewater treatment equipment according to a twelfth embodiment of the invention.

The twelfth embodiment is different from the above-described eleventh embodiment only in the contents of an influent. Therefore, like components are designated by like reference numerals in the eleventh embodiment and detailed description thereof is omitted.

While an influent is hydrogen peroxide containing fluorine wastewater in the eleventh embodiment, the influent is organic matter containing fluorine wastewater in the twelfth embodiment.

Anaerobic microorganisms are propagated in sludge containing calcium fluoride floc, aluminium fluoride floc, aluminium hydroxide floc, unreacted calcium hydroxide and unreacted polymer coagulants in the sludge zone 23 with the passage of time. Since anaerobic microorganisms have an organic matter decomposing action, organic matter contained in wastewater can be treated by this organic matter decomposing action. Since sludge in the upper portion of the sludge zone 23 is distant from the introducing pipe 18 as compared with sludge in the lower portion, its liquid state is close to neutral and thereby anaerobic microorganisms can be propagated. However, sludge in the lower portion of the sludge zone 23 is influenced by acidity of organic matter containing fluorine wastewater and thereby anaerobic microorganisms cannot be easily propagated. Organic matter contained in fluorine wastewater is always treated in the upper portion of the sludge zone 23, where anaerobic microorganisms are propagated.

Figure 14:
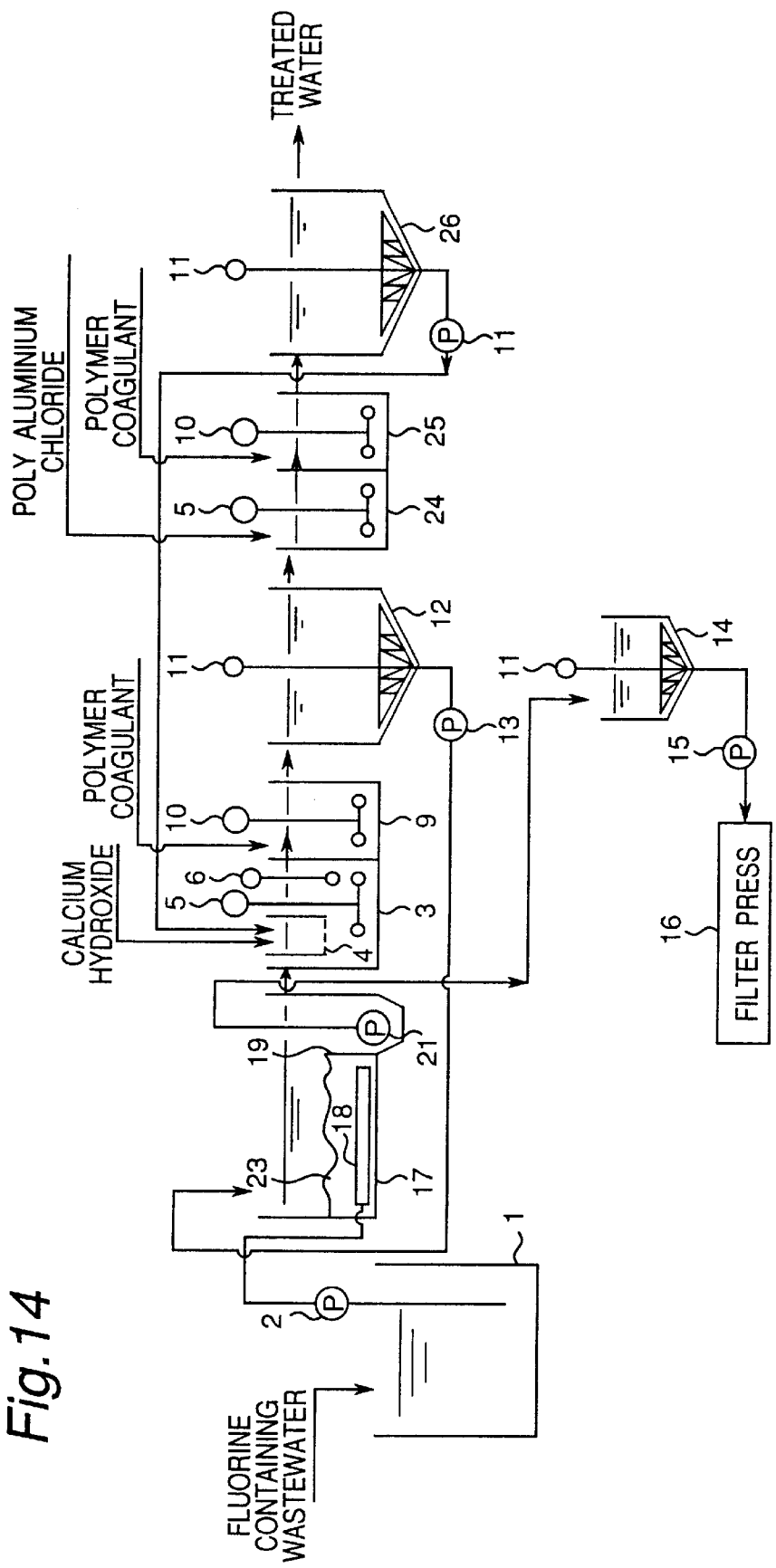
FIG. 14 is a diagram showing a wastewater treatment equipment according to a thirteenth embodiment of the invention.

FIG. 14 shows a wastewater treatment equipment according to a thirteenth embodiment of the invention.

The thirteenth embodiment is different from the above-described twelfth embodiment only in processings after the precipitating tank (fifth water tank) 12. Therefore, like components are designated by like reference numerals in the twelfth embodiment and detailed description thereof is omitted.

Although there is no processing after the precipitating tank 12 in the twelfth embodiment, a poly aluminium chloride coagulating tank (seventh water tank) 24, to which poly aluminium chloride is added, and a polymer coagulant coagulating tank (eighth water tank) 25, to which a polymer coagulant is added, and a second precipitating tank (ninth water tank) 26 are installed after the first precipitating tank 12 in the thirteenth embodiment.

A rapid reaction tank agitator 5 is installed in the poly aluminium chloride coagulating tank 24. A slow coagulating tank agitator 10 is installed in the polymer coagulant coagulating tank 25.

Fluorine in wastewater after the first precipitating tank 12 is mainly treated by adding poly aluminium chloride and polymer coagulants to wastewater to coagulate fine particles and form a large, stable floc. Then, the large, stable floc is precipitated in the second precipitating tank 26. The precipitated sludge is returned to the separate reaction unit 4 by the ninth water tank returning pump 27. As in the case of the twelfth embodiment, calcium hydroxide is added to sludge containing a large amount of coagulants so that aluminium is eluted and recycled.

Figure 15:
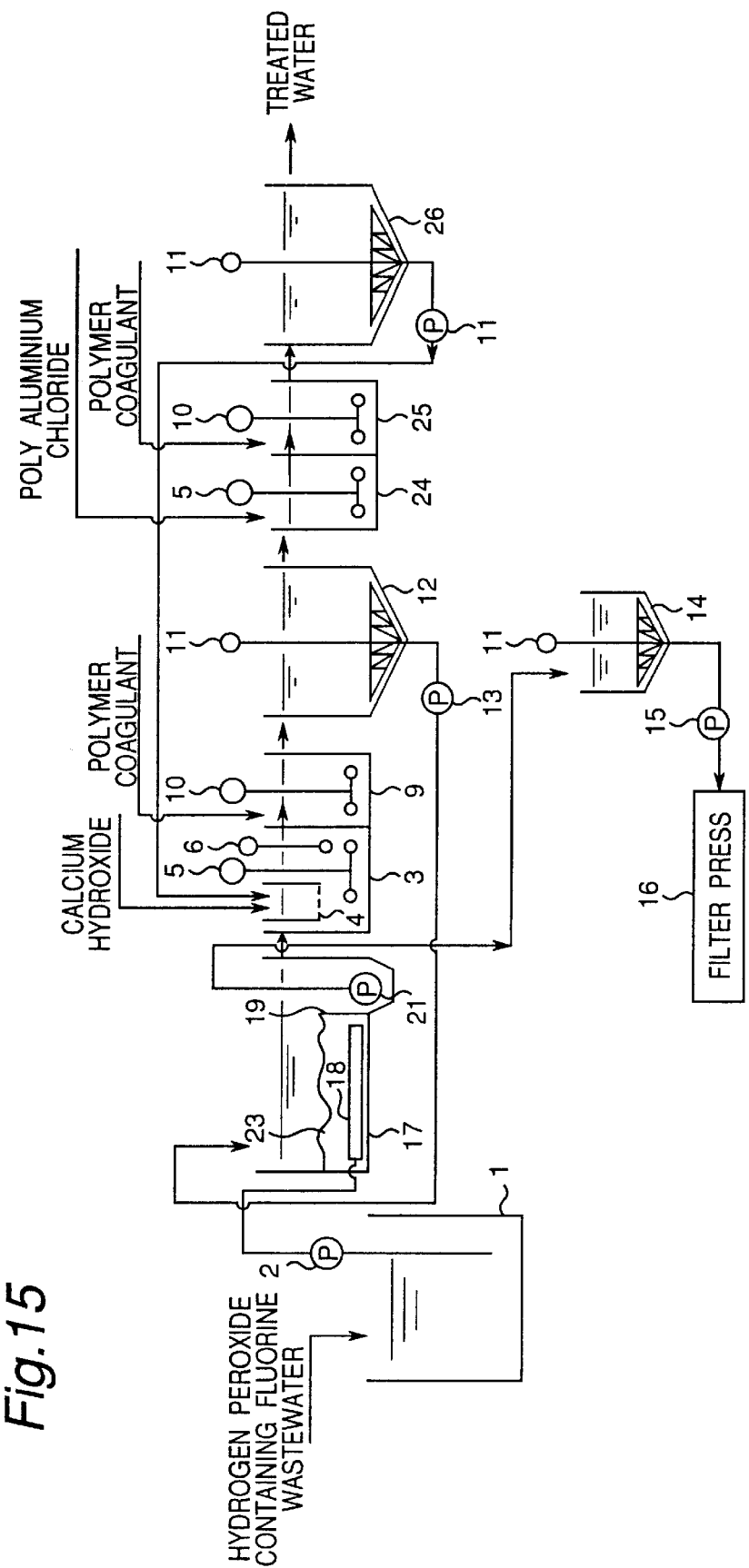
FIG. 15 is a diagram showing a wastewater treatment equipment according to a fourteenth embodiment of the invention.

FIG. 15 shows a wastewater treatment equipment according to a fourteenth embodiment of the invention.

The fourteenth embodiment is different from the above-described thirteenth embodiment only in the contents of an influent. Therefore, like components are designated by like reference numerals in the thirteenth embodiment and detailed description thereof is omitted.

While an influent is fluorine wastewater in the thirteenth embodiment, the influent is hydrogen peroxide containing fluorine wastewater in the fourth embodiment.

Anaerobic microorganisms are propagated in sludge containing calcium fluoride floc, aluminium fluoride floc, aluminium hydroxide floc, unreacted calcium hydroxide and unreacted polymer coagulants in the sludge zone 23 with the passage of time. Since anaerobic microorganisms have a reductive action, hydrogen peroxide contained in wastewater can be treated by this reductive action.

Since sludge in the upper portion of the sludge zone 23 is distant from the introducing pipe 18 as compared with sludge in the lower portion, its liquid state is close to neutral and thereby anaerobic microorganisms can be propagated. However, sludge in the lower portion of the sludge zone 23 is influenced by acidity of hydrogen peroxide containing fluorine wastewater and thereby anaerobic microorganisms cannot be easily propagated. Hydrogen peroxide contained in fluorine wastewater is always treated in the upper portion of the sludge zone 23, where anaerobic microorganisms are propagated.

Figure 16:
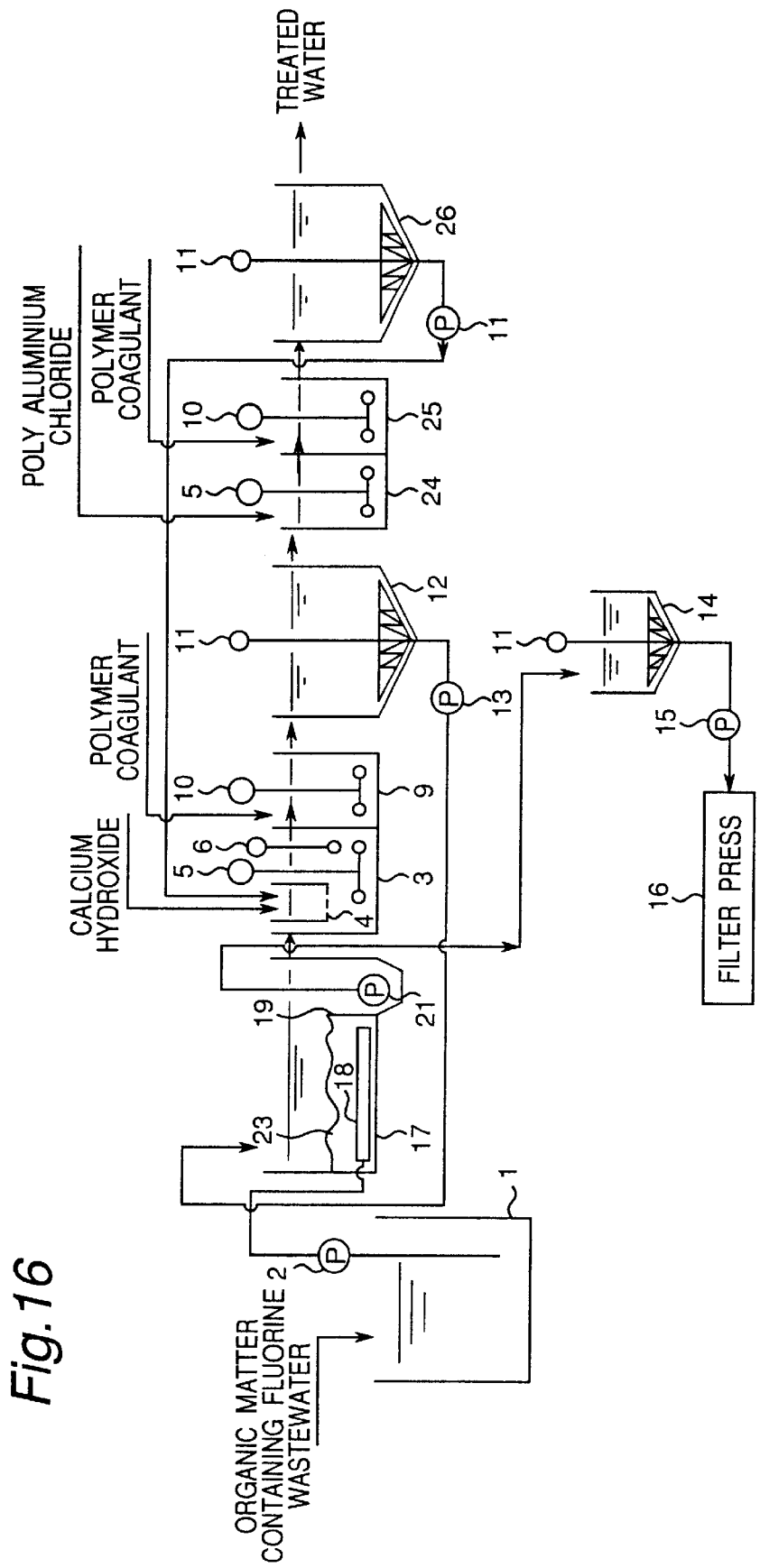
FIG. 16 is a diagram showing a wastewater treatment equipment according to a fifteenth embodiment of the invention.
Figure 17:
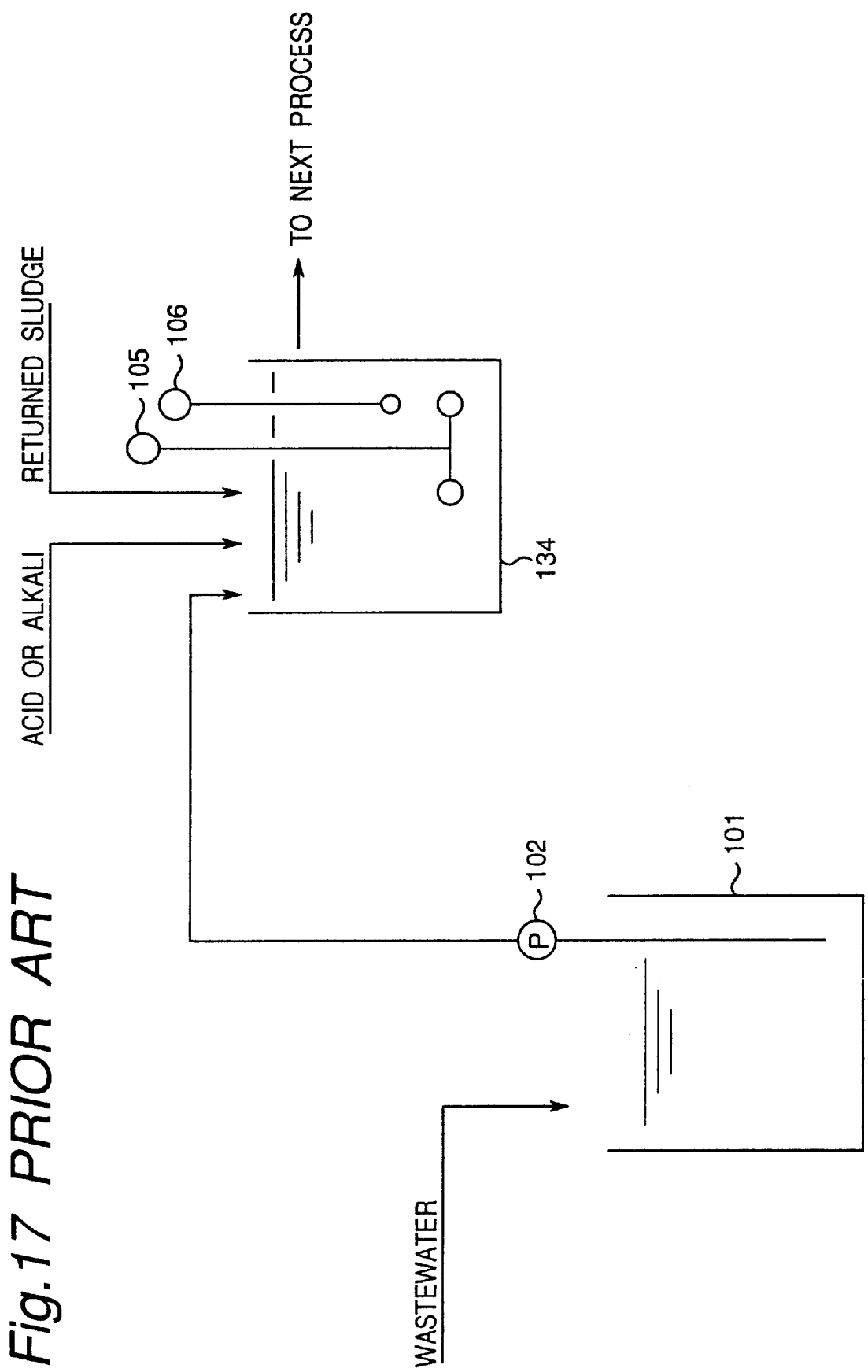
FIG. 17 is a diagram showing a conventional wastewater treatment equipment.

FIG. 16 shows a wastewater treatment equipment according to an fifteenth embodiment of the invention.

The fifteenth embodiment is different from the above-described fourteenth embodiment only in the contents of an influent. Therefore, like components are designated by like reference numerals in the fourteenth embodiment and detailed description thereof is omitted.

While an influent is hydrogen peroxide containing fluorine wastewater in the fourteenth embodiment, the influent is organic matter containing fluorine wastewater in the fifteenth embodiment.

In the fifteenth embodiment, anaerobic microorganisms are propagated in sludge containing calcium fluoride floc, aluminium fluoride floc, aluminium hydroxide floc, unreacted calcium hydroxide and unreacted polymer coagulants in the sludge zone 23 with the passage of time. Since anaerobic microorganisms have an organic matter decomposing action, organic matter contained in wastewater can be treated by this organic matter decomposing action. Since sludge in the upper portion of the sludge zone 23 is distant from the introducing pipe 18 as compared with sludge in the lower portion, its liquid state is close to neutral and thereby anaerobic microorganisms can be propagated. However, sludge in the lower portion of the sludge zone 23 is influenced by acidity of organic matter containing fluorine wastewater and thereby anaerobic microorganisms cannot be easily propagated. Organic matter contained in fluorine wastewater is always treated in the upper portion of the sludge zone 23, where anaerobic microorganisms are propagated.

FIRST EXPERIMENTAL EXAMPLE

An example of a wastewater treatment using experimental equipment having the same structure as in the ninth embodiment shown in FIG. 9 is described below as a specific embodiment.

In wastewater treatment of the first experimental example, the volume of a first water tank 1 was 2 $m^3$. The volume of the separate reaction unit 4 and the reaction tank 3 combined was 2 $m^3$. The volume of the separate reaction unit 4 was 0.4 $m^3$. The volume of the third water tank 7 was 1.5 $m^3$. The volume of the fourth water tank 9 was 1.5 $m^3$. The volume of the fifth water tank 12 was 6 $m^3$. The volume of the sixth water tank 14 was 1 $m^3$. Wastewater was treated by using this experimental equipment with fluorine containing wastewater having pH 2.2 and a fluorine concentration of 172 ppm. As a result, the wastewater had pH 6.8 and a fluorine concentration of 8.3 ppm after treatment.

SECOND EXPERIMENTAL EXAMPLE

An example of a wastewater treatment using experimental equipment having the same structure as in the tenth embodiment shown in FIG. 11 is described below as a specific embodiment.

In wastewater treatment of the first experimental example, the volume of the first water tank 1 was 2 $m^3$. The volume of the recycling tank 17 was 3 $m^3$. The volume of the separate reaction unit 4 and the reaction tank 3 combined was 2 $m^3$. The volume of the separate reaction unit 4 was 0.4 $m^3$. The volume of the third water tank 7 was 1.5 $m^3$. The volume of the fourth water tank 9 was 1.5 $m^3$. The volume of the fifth water tank 12 was 6 $m^3$. The volume of the sixth water tank 14 was 1 $m^3$.

Wastewater was treated by using this experimental equipment with fluorine containing wastewater having pH 2.1 and a fluorine concentration of 195 ppm. The wastewater had pH 6.9 and a fluorine concentration of 7.5 ppm after treatment.

The invention being thus described, it will be obvious that the invention may be varied in many ways. Such variations are not be regarded as a departure from the spirit and scope of the invention, and all such modifications as would be obvious to one skilled in the art are intended to be included within the scope of the following claims.

What is claimed is:

1. A method of treating wastewater comprising:
   introducing wastewater into a reaction tank;
   introducing (a) returned sludge and (b) acid or alkali into a separate reaction unit installed in the reaction tank to obtain a separate reactant by carrying out a separate reaction from a reaction in the reaction tank; and
   introducing the separate reactant from the separate reaction unit into the reaction tank.

2. A wastewater treatment equipment comprising:
   a reaction tank into which wastewater is introduced for reaction of the wastewater; and
   a separate reaction unit installed in the reaction tank, into which (a) returned sludge, and (b) acid and/or alkali are introduced, in which a separate reaction from a reaction in the reaction tank is carried out to obtain a separate reactant, and from which the separate reactant is introduced into the reaction tank.

3. A wastewater treatment equipment comprising:
   a reaction tank into which wastewater is introduced for reaction of the wastewater;
   a separate reaction unit installed in the reaction tank, into which returned sludge is introduced, in which a separate reaction from a reaction in the reaction tank is carried out to obtain a separate reactant, and from which the separate reactant is introduced into the reaction tank; and
   wherein the separate reaction unit is an elution unit for eluting a chemical from reactants and unreacted chemicals contained in the returned sludge.

4. The wastewater treatment equipment according to claim 3, wherein the reactants and the unreacted chemicals are substances derived from coagulants.

5. The wastewater treatment equipment according to claim 3, wherein an acid or a alkali is added into the elution unit.

6. The wastewater treatment equipment according to claim 2, wherein the returned sludge contains aluminum or iron.

7. The wastewater treatment equipment according to claim 5, wherein the acid is a mineral acid and the alkali is calcium hydroxide or sodium hydroxide or both of them.

8. The wastewater treatment equipment according to claim 2, wherein the separate reaction unit is provided with an agitating means.

9. The wastewater treatment equipment according to claim 8, wherein the agitating means of the separate reaction unit is a non-submersible agitator.

10. The wastewater treatment equipment according to claim 8, wherein the agitating means of the separate reaction unit is a submersible agitator.

11. The wastewater treatment equipment according to claim 8, wherein the agitating means of the separate reaction unit is an agitating means by aeration.

12. A wastewater treatment equipment comprising:
    a reaction tank into which wastewater is introduced for reaction of the wastewater;
    a separate reaction unit installed in the reaction tank, into which returned sludge is introduced, in which a separate reaction from a reaction in the reaction tank is carried out to obtain a separate reactant, and from which the separate reactant is introduced into the reaction tank; and
    wherein a pH meter is provided in the separate reaction unit.

13. A wastewater treatment equipment comprising:
    a reaction tank into which wastewater is introduced for reaction of the wastewater;
    a separate reaction unit installed in the reaction tank, into which returned sludge is introduced, in which a separate reaction from a reaction in the reaction tank is carried out to obtain a separate reactant, and from which the separate reactant is introduced into the reaction tank; and
    wherein the separate reaction unit is a line mixer.

14. A wastewater treatment equipment comprising:

a reaction tank into which wastewater is introduced for reaction of the wastewater;

a separate reaction unit installed in the reaction tank, into which returned sludge is introduced, in which a separate reaction from a reaction in the reaction tank is carried out to obtain a separate reactant, and from which the separate reactant is introduced into the reaction tank; and wherein the separate reaction unit is a cyclone.

15. A wastewater treatment equipment for treatment of fluorine inclusive wastewater, comprising:

an acid raw water tank;

a reaction tank;

a poly aluminum chloride coagulating tank;

a polymer coagulant coagulating tank;

a precipitating tank; and an elution unit installed in the reaction tank, into which returned sludge from the precipitating tank is introduced, in which a separate reaction from a reaction in the reaction tank is carried out to elute a chemical from reactants and unreacted chemicals contained in the returned sludge, and from which the eluted chemical is introduced into the reaction tank.

16. A wastewater treatment equipment for treatment of fluorine inclusive wastewater which comprises hydrogen peroxide and/or organic matter, comprising:

an acid raw water tank;

a recycling tank having a precipitation section, to which returned sludge is introduced;

a reaction tank;

a poly aluminum chloride coagulating tank;

a polymer coagulant coagulating tank;

a precipitating tank; and an elution unit installed in the reaction tank, into which returned sludge from the precipitating tank is introduced, in which a separate reaction from a reaction in the reaction tank is carried out to elute a chemical from reactants and unreacted chemicals contained in the returned sludge, and from which the eluted chemical is introduced into the reaction tank.

17. A wastewater treatment equipment for treatment of fluorine inclusive wastewater, comprising:

an acid raw water tank;

a recycling tank having a precipitation section, to which returned sludge is introduced;

a reaction tank;

a first polymer coagulant coagulating tank;

a first precipitating tank from which sludge is returned to the recycling tank;

a poly aluminum chloride coagulating tank;

a second polymer coagulant coagulating tank;

a second precipitating tank; and an elution unit installed in the reaction tank, into which returned sludge from the second precipitating tank is introduced, in which a separate reaction from the reaction in the reaction tank is carried out to elute a chemical from reactants and unreacted chemicals contained in the returned sludge, and from which the eluted chemical is introduced into the reaction tank.

* * * * *